(12) United States Patent
Miyata

(10) Patent No.: US 9,112,755 B2
(45) Date of Patent: Aug. 18, 2015

(54) WIRELESS COMMUNICATION DEVICE

(75) Inventor: Takeo Miyata, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/235,010

(22) PCT Filed: Jul. 23, 2012

(86) PCT No.: PCT/JP2012/068594
§ 371 (c)(1),
(2), (4) Date: Jan. 24, 2014

(87) PCT Pub. No.: WO2013/015246
PCT Pub. Date: Jan. 31, 2013

(65) Prior Publication Data
US 2014/0198866 A1 Jul. 17, 2014

(30) Foreign Application Priority Data
Jul. 27, 2011 (JP) ................................. 2011-164093

(51) Int. Cl.
*H04B 7/02* (2006.01)
*H04L 27/26* (2006.01)
*H04B 7/06* (2006.01)

(52) U.S. Cl.
CPC .......... *H04L 27/2601* (2013.01); *H04B 7/0689* (2013.01)

(58) Field of Classification Search
CPC .. H04B 7/0689; H04B 7/0452; H04B 7/0871; H04B 7/0413; H04B 7/0617; H04B 7/0632; H04L 25/03343
USPC .......................... 375/260, 267, 296, 346, 347
See application file for complete search history.

(56) References Cited

U.S. PATENT DOCUMENTS 7,574,236 B1 * 8/2009 Mansour .................... 455/562.1
8,416,872 B2    4/2013 Higuchi et al.
(Continued)

FOREIGN PATENT DOCUMENTS

JP     2006-287727 A    10/2006
JP     2009-130702 A    6/2009
(Continued)

OTHER PUBLICATIONS

International Search Report issued in copending PCT Application No. PCT/JP2012/068594 on Oct. 9, 2012.
International Preliminary Report on Patentability and International Search Report issued Feb. 6, 2014 for the International Application No. PCT/JP2012/068594.

*Primary Examiner* — Shuwang Liu
*Assistant Examiner* — David S Huang
(74) *Attorney, Agent, or Firm* — Procopio, Cory, Hargreaves & Savitch LLP

(57) ABSTRACT

A wireless communication device communicates with, using a plurality of antennas, a communication partner device including a plurality of antennas. The wireless communication device includes a communication unit, an interference intensity judgment unit, and a determination unit. The communication unit communicates with the communication partner device using the plurality of antennas and is configured to use a MIMO (multiple input multiple output) scheme when transmitting a signal to the communication partner device. The interference intensity judgment unit judges, based on predetermined criteria, whether or not an intensity of an interference wave included in a received signal at the communication partner device is high. The determination unit prohibits, upon the interference intensity judgment unit judging that the intensity of the interference wave is high, the communication unit from using the MIMO scheme when transmitting a signal.

8 Claims, 12 Drawing Sheets

(56) References Cited

U.S. PATENT DOCUMENTS

| | | | |
|---|---|---|---|
| 8,571,557 B2 | 10/2013 | Furukawa | |
| 2006/0083195 A1* | 4/2006 | Forenza et al. | 370/328 |
| 2008/0247327 A1* | 10/2008 | Weil et al. | 370/252 |
| 2010/0157925 A1* | 6/2010 | Francos | 370/329 |
| 2011/0034191 A1* | 2/2011 | Leabman | 455/501 |

FOREIGN PATENT DOCUMENTS

| | | |
|---|---|---|
| JP | 2010-50852 A | 3/2010 |
| WO | 2006/106613 A1 | 10/2006 |

* cited by examiner

F I G . 3
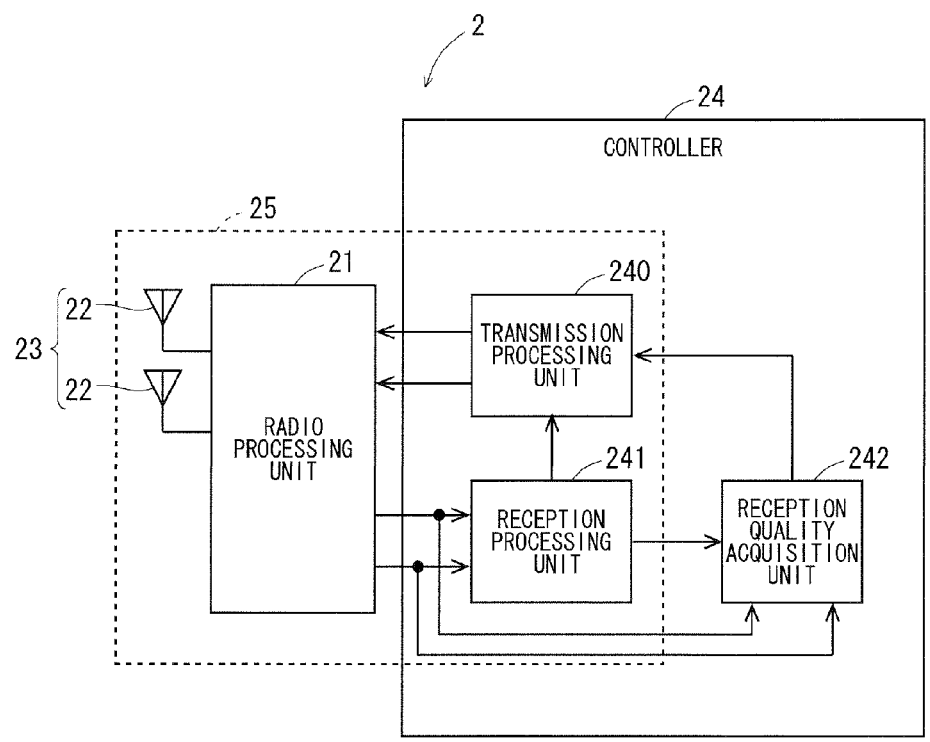

F I G . 4
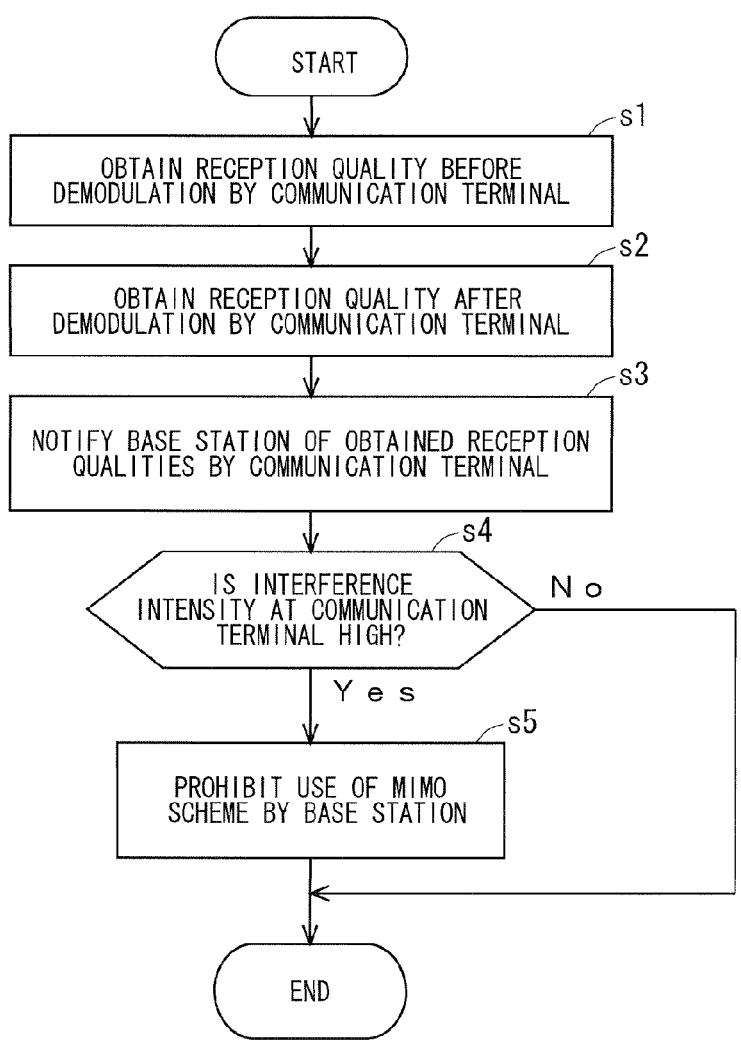

F I G. 5
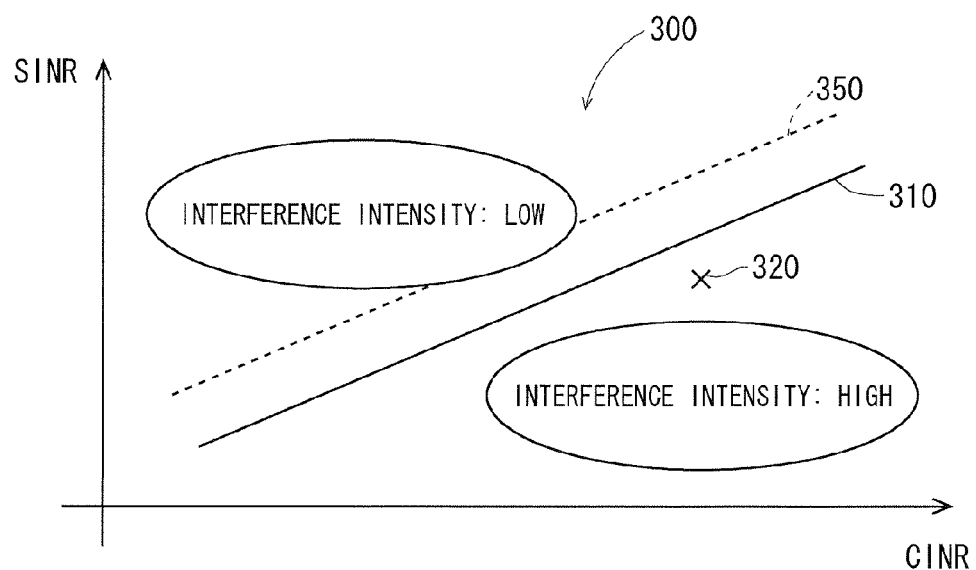

F I G . 8
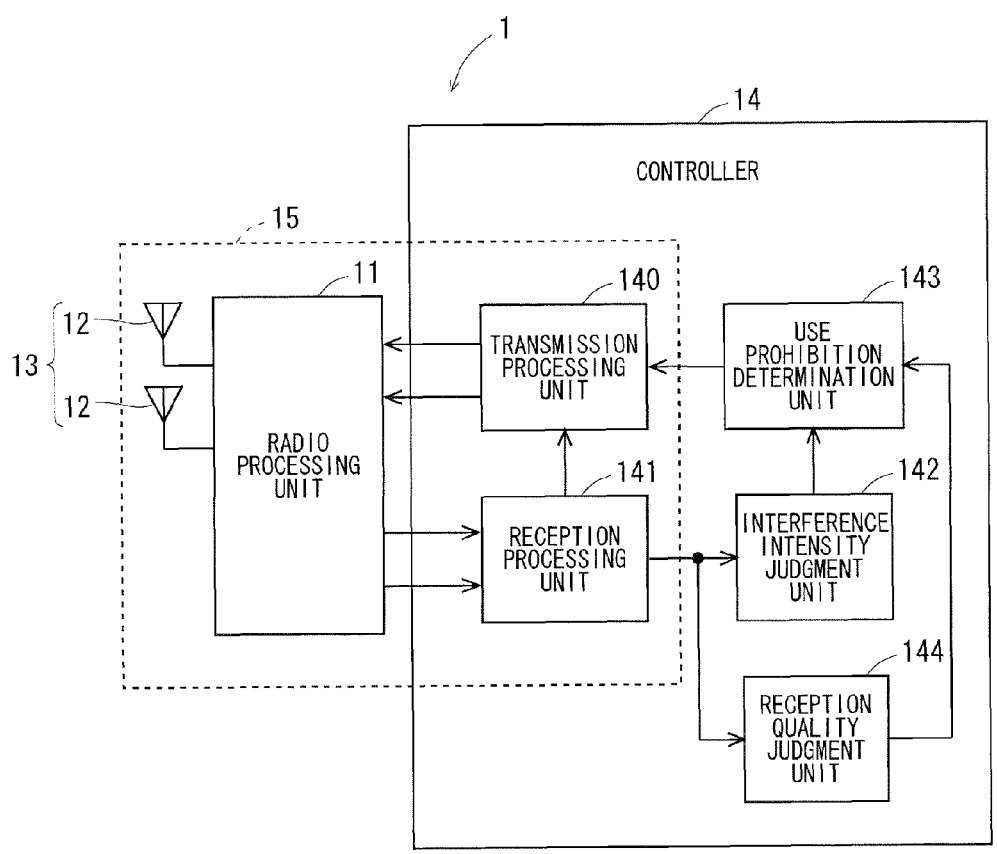

F I G. 1 1
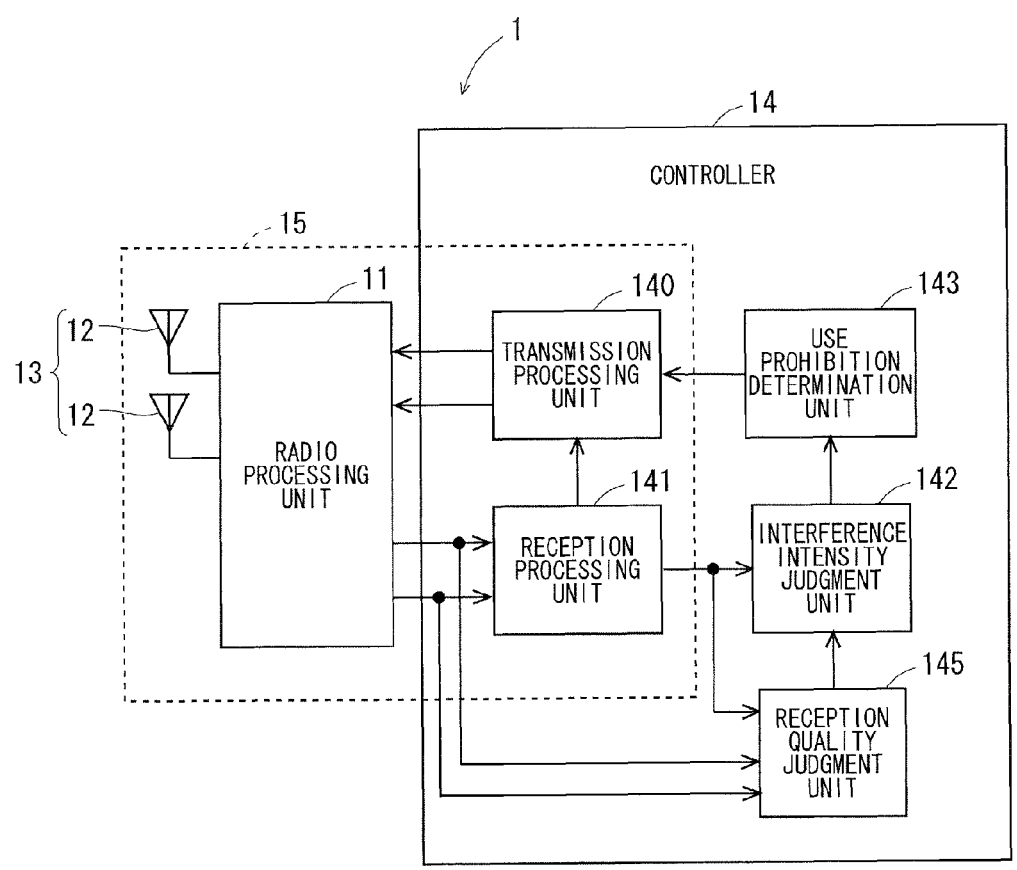

WIRELESS COMMUNICATION DEVICE

TECHNICAL FIELD

The present invention relates to a technique of performing communication using a plurality of antennas.

BACKGROUND ART

Various techniques of radio communication have been conventionally proposed. For example, Patent Document 1 discloses the technique of using a MIMO (multiple input multiple output) scheme in communication between a plurality of wireless communication devices.

PRIOR-ART DOCUMENT

Patent Document

Patent Document 1: Japanese Patent Application Laid-Open No. 2009-130702

SUMMARY OF INVENTION

Problem to be Solved by the Invention

The wireless communication system including a plurality of wireless communication devices is desired to improve the communication performance between the plurality of wireless communication devices.

The present invention therefore has been made in view of the above, and an object thereof is to provide a technique capable of improving the communication performance between a plurality of wireless communication devices.

Means for Solving the Problem

A wireless communication device according to one aspect communicates with, using a plurality of antennas, a communication partner device including a plurality of antennas, which includes: a communication unit that communicates with the communication partner device using the plurality of antennas and is configured to use a MIMO (multiple input multiple output) scheme when transmitting a signal to the communication partner device; an interference intensity judgment unit that judges, based on predetermined criteria, whether or not an intensity of an interference wave included in a received signal at the communication partner device is high; and a determination unit that determines to prohibit, upon the interference intensity judgment unit judging that the intensity of the interference wave is high, the communication unit from using the MIMO scheme when transmitting a signal.

A wireless communication system according to one aspect includes first and second wireless communication devices that communicate with each other, wherein: the first wireless communication device includes: a first communication unit that communicates with the second wireless communication device using a plurality of antennas and is configured to use a MIMO (multiple input multiple output) scheme when transmitting a signal to the second wireless communication unit; an interference intensity judgment unit that judges, based on predetermined criteria, whether or not an intensity of an interference wave included in a received signal at the second wireless communication device is high; and a determination unit that determines to prohibit, upon the interference intensity judgment unit judging that the intensity of the interference wave is high, the first communication unit from using the MIMO scheme when transmitting a signal; the second wireless communication device includes a second communication unit that communicates with the first wireless communication device using a plurality of antennas and is configured to, when receiving a signal from the first wireless communication device, perform null steering using an algorithm that does not need information regarding an interference wave for the reception directivity at the plurality of antennas; in a case where the first wireless communication device transmits a signal without using the MIMO scheme, the second communication unit performs the null steering based on a known reference signal from the first wireless communication device and then receives a data signal from the first wireless communication device; and in a case where the first wireless communication device transmits a signal using the MIMO scheme, the second communication unit does not perform the null steering based on a known reference signal from the first wireless communication device and then receives a data signal from the first wireless communication device.

A wireless communication device according to one aspect communicates with, using a plurality of antennas, a communication partner device including a plurality of antennas, the communication partner device being configured to use a MIMO (multiple input multiple output) scheme when transmitting a signal to the wireless communication device, the communication partner device including a communication unit that communicates with the communication partner device using the plurality of antennas and is configured to, when receiving a signal from the communication partner device, perform null steering using an algorithm that does not need information regarding an interference wave for the reception directivity at the plurality of antennas, wherein: in a case where the communication partner device transmits a signal without using the MIMO scheme, the communication unit performs the null steering based on a known reference signal from the communication partner device and then receives a data signal from the communication partner device; and in a case where the communication partner device transmits a signal using the MIMO scheme, the communication unit estimates a channel matrix of a desired wave based on the known reference signal, which has been received through the null steering based on a known reference signal from the communication partner device, from the communication partner device and then performs a reception process on the data signal from the communication partner device using the estimated channel matrix.

A wireless communication device according to one aspect communicates with, using a plurality of antennas, a communication partner device including a plurality of antennas, the communication partner device being configured to use a MIMO (multiple input multiple output) scheme when transmitting a signal to the wireless communication device, and the wireless communication device includes: a communication unit that communicates with the communication partner device using the plurality of antennas; an interference intensity judgment unit that judges, based on predetermined criteria, whether or not an intensity of an interference wave included in a received signal at the communication unit is high; and a determination unit that determines to prohibit, upon the interference intensity judgment unit judging that the intensity of the interference wave is high, the use of the MIMO scheme when the communication partner device transmits a signal.

A wireless communication system according to one aspect includes first and second wireless communication devices that communicate with each other, wherein: the second wireless communication device communicates with the first wireless communication device using a plurality of antennas and is configured to use a MIMO (multiple input multiple output) scheme when transmitting a signal to the first wireless communication device; the first wireless communication device includes: a communication unit that communicates with the second wireless communication device using a plurality of antennas and is configured to perform, when receiving a signal from the second wireless communication device, null steering using an algorithm that does not need information regarding an interference wave for the reception directivity at the plurality of antennas; an interference intensity judgment unit that judges, based on predetermined criteria, whether or not an intensity of an interference wave included in a received signal at the communication unit is high; and a determination unit that prohibits, upon the interference intensity judgment unit judging that the intensity of the interference wave is high, the use of the MIMO scheme when the second wireless communication unit transmits a signal, in a case where the second wireless communication device transmits a signal without using the MIMO scheme; the communication unit performs the null steering based on a known reference signal from the second wireless communication device and then receives a data signal from the second wireless communication device; and in a case where the second wireless communication device transmits a signal using the MIMO scheme, the communication unit does not perform the null steering based on the known reference signal from the second wireless communication device and then receives a data signal from the second wireless communication device.

Effects of the Invention

The present invention can improve the communication performance between a plurality of wireless communication devices.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a diagram showing a configuration of a communication terminal according to the embodiment of the present invention.

FIG. 4 is a flowchart showing an operation of the wireless communication system according to the embodiment of the present invention.

FIG. 5 is a diagram for describing an operation of an interference intensity judgment unit.

FIG. 8 is a diagram showing a configuration of a modification of the base station.

FIG. 11 is a diagram showing a configuration of another modification of the base station.

DESCRIPTION OF EMBODIMENTS

Figure 1:
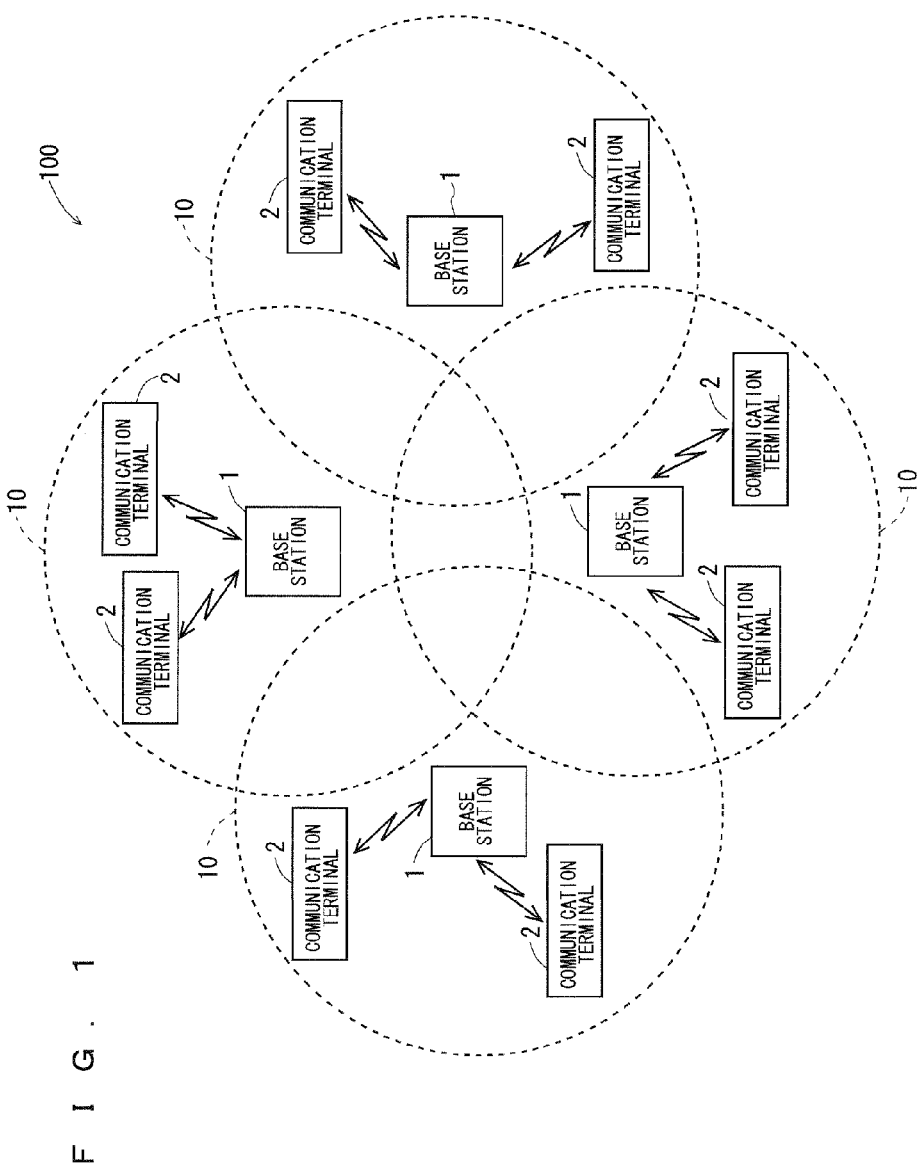
FIG. 1 is a diagram showing a configuration of a wireless communication system according to an embodiment of the present invention.

FIG. 1 is a diagram showing a configuration of a wireless communication system 100 according to an embodiment of the present invention. The wireless communication system 100 is a wireless communication system adopting an orthogonal frequency division multiplexing (OFDM) scheme such as worldwide interoperability for microwave access (WiMAX) and long term evolution (LTE). In the OFDM scheme, an OFDM signal obtained by combining a plurality of orthogonal subcarriers is used. The wireless communication system 100 according to this embodiment adopts, for example, a time division duplexing (TDD) scheme as a duplexing scheme.

As shown in FIG. 1, the wireless communication system 100 includes a plurality of base stations 1 being wireless communication devices. Each base station 1 performs two-way radio communications with a plurality of communication terminals 2 being wireless communication devices. The plurality of communication terminals 2 include mobile communication terminals such as cellular phones. A service area 10 of each base station 1 partially overlaps service areas 10 of the neighboring base stations 1. FIG. 1 shows only four base stations 1, and accordingly, only two or three neighboring base stations 1 are located for one base station 1. In actuality, however, for example, six neighboring base stations 1 may be located for one base station 1.

The plurality of base stations 1 are connected to a network (not shown) and are capable of communicating with each other through this network. A server device (not shown) is connected to the network. Each base station 1 is capable of communicating with the server device through the network.

<Configuration of Base Station>

Figure 2:
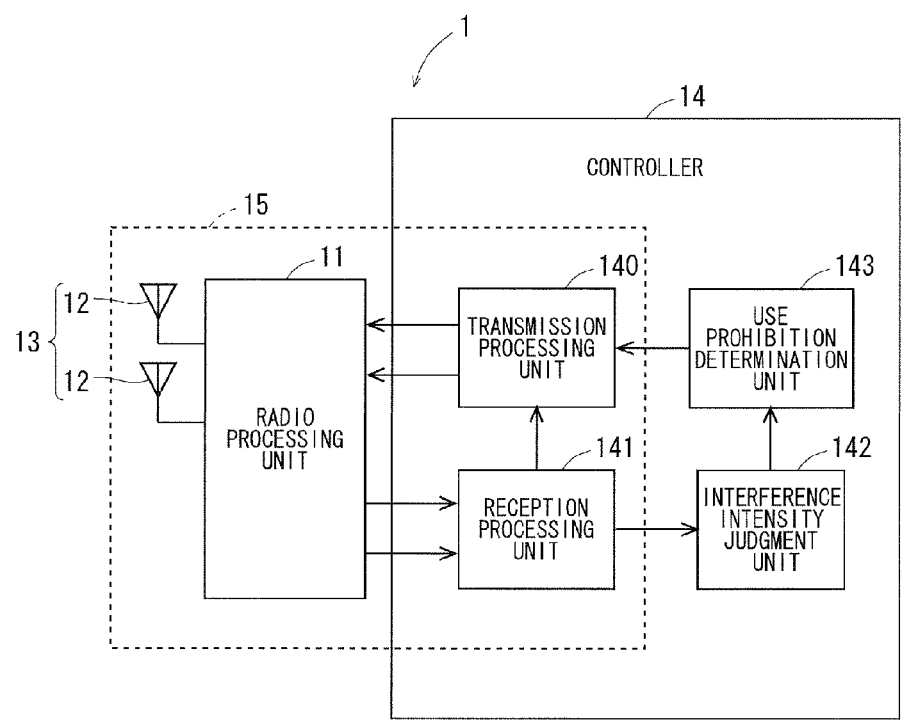
FIG. 2 is a diagram showing a configuration of a base station according to the embodiment of the present invention.

FIG. 2 is a diagram showing a configuration of each base station 1. The base station 1 according to the embodiment of the present invention can use two types of schemes, the MIMO scheme and adaptive array antenna scheme, when transmitting signals to the communication terminal 2. The base station 1 uses the adaptive array antenna scheme when receiving signals from the communication terminal 2. When receiving a signal from the communication terminal 2 using the adaptive array antenna scheme, the base station 1 obtains a reception weight to be set to a reception signal for controlling the reception directivity at the base station 1, based on a known reference signal from the communication terminal 2. When transmitting signals to the communication terminal 2 using the adaptive array antenna scheme, the base station 1 obtains a transmission weight to be set in a transmission signal for controlling the transmission directivity at the base station 1, from the reception weight.

Here, the MIMO scheme is a concept including the scheme for improving a transmission speed (transmission throughput), such as spatial division multiplexing (SDM), and the schemes for improving a communication quality, such as space-time coding (STC) and space frequency block coding (SFBC). The SDM may be merely referred to as "spatial multiplexing (SM)". Also, the MIMO schemes that improve a communication quality, such as STC and SFBC, may be referred to as "transmission diversity". In this embodiment, the base station 1 uses, for example, the SDM. The base station 1 may alternatively use the SDM and the MIMO scheme that improves a communication quality, such as STC or SFBC. Hereinafter, the SDM, STC, and SFBC may also be referred to as "MIMO-SDM", "MIMO-STC", and "MIMO-SFBC".

In the adaptive array antenna scheme to be used in reception and transmission by the base station 1, null steering, which uses an algorithm that does not need the information of an interference wave included in a reception signal at the base station 1, specifically, a channel matrix (also referred to as a response vector or channel vector) for the interference wave, is performed when a reception weight is obtained. As the algorithm that does not need the information of an interference wave, for example, a minimum mean squared error (MMSE) such as least mean square (LMS) algorithm or recursive least-squares (RLS) algorithm is adoptable. In the case where the LMS algorithm or RLS algorithm is used, null steering and beamforming are both performed. In this embodiment, the LMS algorithm or RLS algorithm is used, and accordingly, null steering and beamforming are both performed for the transmission directivity and reception directivity.

The interference wave included in the reception signal at the base station 1 is an unnecessary signal from a communication device other than the communication terminal 2 (communication terminal 2 within the service area 10 of the base station 1) being a communication target for the base station 1. The interference wave includes, for example, an unnecessary signal from a communication terminal 2 that communicates with a neighboring base station 1 located near this base station 1.

In the wireless communication system 100 according to this embodiment, each base station 1 cannot identify a location of the communication terminal 2 that communicates with the neighboring base station 1 located near itself. For this reason, each base station 1 cannot identify through which transmission path (channel) an interference wave from the communication terminal 2 communicating with the neighboring base station 1 passes. Thus, in the adaptive array antenna scheme according to this embodiment, null steering, which uses an algorithm that does not need the information of an interference wave (channel matrix of an interference wave), such as an LMS algorithm, is performed.

As shown in FIG. 2, the base station 1 includes a radio processing unit 11 including an array antenna 13 composed of a plurality of antennas 12, and a controller 14 that controls the radio processing unit 11. The radio processing unit 11 performs an amplification process, down-conversion, A/D conversion process, and the like on each of a plurality of received signals received by the array antenna 13, to thereby generate and output a plurality of received signals of a baseband.

The radio processing unit 11 performs a D/A conversion process, up-conversion, amplification process, and the like on each of a plurality of transmission signals of a baseband generated by the controller 14, to thereby generate a plurality of transmission signals of a carrier band. Then, the radio processing unit 11 respectively inputs the generated plurality of transmission signals of the carrier band to the plurality of antennas 12 constituting the array antenna 13. Accordingly, the transmission signal is wirelessly transmitted from each antenna 12.

The radio processing unit 11 is provided with two antennas 12 in the example of FIG. 2, which may be provided with two or more antennas 12.

The controller 14 is composed of a central processing unit (CPU), a digital signal processor (DSP), a memory, and the like. In the controller 14, the CPU and DSP execute a program in the memory, whereby functional blocks are formed, such as a transmission processing unit 140, a reception processing unit 141, an interference intensity judgment unit 142, and a use prohibition determination unit 143.

The transmission processing unit 140 generates a transmission signal and performs a modulation process or the like on the transmission signal, to thereby generate a transmission signal of a baseband. As many transmission signals of the baseband as the plurality of antennas 12 constituting the array antenna 13 are generated. The plurality of transmission signals of the baseband generated by the transmission processing unit 140 are input to the radio processing unit 11.

The transmission processing unit 140 generates a plurality of transmission signals according to a transmission scheme used in the base station 1. For example, in a case where the adaptive array antenna scheme is used in the base station 1, the transmission processing unit 140 generates as many identical transmission signals as the antennas 12. After that, the transmission processing unit 140 sets, for the obtained plurality of transmission signals, a plurality of transmission weights for controlling the transmission directivity of the array antenna 13. Then, the transmission processing unit 140 performs a modulation process or the like on the plurality of transmission signals in which transmission weights have been respectively set, and thereafter, inputs the plurality of transmission signals to the radio processing unit 11. As a result, the base station 1 performs null steering and beamforming for the transmission directivity of the array antenna 13, so that a transmission signal is transmitted to the communication terminal 2.

Meanwhile, in a case where the base station 1 uses the MIMO-SDM, the transmission processing unit 140 generates transmission signals of a plurality of systems (a plurality of different transmission signals). Then, the transmission processing unit 140 performs the modulation process or the like on the obtained plurality of transmission signals, and thereafter, inputs the plurality of transmission signals to the radio processing unit 11. As a result, the base station 1 transmits the transmission signals of the plurality of systems to the communication terminal 2 using the same radio resources (frequency band and time slot), which improves a transmission throughput of the base station 1.

In a case where the base station 1 uses the MIMO-STC or MIMO-SFBC, the transmission processing unit 140 generates a plurality of different transmission signals coded by, for example, alamouti coding. Then, the transmission processing unit 140 performs the modulation process on the obtained plurality of transmission signals, and then, inputs the plurality of transmission signals to the radio processing unit 11. As a result, the base station 1 achieves a transmission diversity effect, which improves the communication quality between the base station 1 and communication terminal 2.

The reception processing unit 141 sets, for a plurality of received signals input from the radio processing unit 11, a plurality of reception weights for controlling the reception directivity at the array antenna 13. The reception processing unit 141 combines the plurality of received signals in which a plurality of reception weights have been respectively set, to thereby generate a combined received signal. Then, the reception processing unit 141 performs a demodulation process or the like on the combined received signal that has been generated, to thereby obtain, for example, control data and user data included in the combined received signal.

The reception processing unit 141 calculates a plurality of reception weights for controlling the reception directivity of the array antenna 13, based on a known reference signal included in the received signal from the communication terminal 2. The reception processing unit 141 calculates a plurality of reception weights using, for example, the LMS algorithm or RLS algorithm. Then, the reception processing unit 141 respectively sets the calculated plurality of reception weights to data signals included in the plurality of received signals output from the radio processing unit 11. As a result, the base station 1 performs null steering and beamforming based on the reference signal from the communication terminal 2 and then receives a data signal of the communication terminal 2.

Meanwhile, the transmission processing unit 140 calculates a plurality of transmission weights for controlling the transmission directivity of the array antenna 13 from the plurality of reception weights obtained by the reception processing unit 141.

In the base station 1 according to this embodiment, a communication unit 15, which communicates with the communication terminal 2 using the array antenna 13, is formed of the radio processing unit 11, transmission processing unit 140, and reception processing unit 141. The communication unit 15 is capable of transmitting a signal using the MIMO scheme and adaptive array antenna scheme, and receives a signal using the adaptive array antenna scheme.

Based on the reception quality at the communication terminal 2 notified from the communication terminal 2, the interference intensity judgment unit 142 judges whether or not the intensity of an interference wave included in the received signal at the communication terminal 2 is high based on predetermined criteria.

When the interference intensity judgment unit 142 judges that the intensity of the interference wave included in the received signal at the communication terminal 2 is high, the use prohibition determination unit 143 prohibits the use of the MIMO scheme in transmission of a signal to this communication terminal 2. When the use prohibition determination unit 143 prohibits the use of the MIMO scheme in transmission of a signal to the communication terminal 2, the communication unit 15 does not use the MIMO scheme but uses the adaptive array antenna scheme in transmission of a signal to this communication terminal 2.

<Configuration of Communication Terminal>

FIG. 3 is a diagram showing a configuration of each communication terminal 2. In a case of receiving a signal from the base station 1, the communication terminal 2 according to the embodiment of the present invention uses the adaptive array antenna scheme when this base station 1 does not use the MIMO scheme in transmitting a signal to this communication terminal 2. Meanwhile, in a case of receiving a signal from the base station 1, the communication terminal 2 is configured not to use the adaptive array antenna scheme when the base station 1 uses the MIMO scheme.

In a case of transmitting a signal to the base station 1, the communication terminal 2 according to this embodiment uses the adaptive array antenna scheme irrespective of whether or not this base station 1 uses the MIMO scheme in transmitting a signal to this communication terminal 2.

Similarly in the adaptive array antenna scheme used by the base station 1, in the adaptive array antenna scheme used in reception and transmission by the communication terminal 2, when a reception weight is obtained, null steering using an algorithm, which does not need the information of an interference wave (channel matrix for an interference wave) included in a received signal at the communication terminal 2, is performed. The communication terminal 2 uses the LMS algorithm or RLS algorithm in calculating a reception weight. Therefore, the communication terminal 2 performs both null steering and beamforming in reception and transmission. Here, the interference wave included in a received signal at the communication terminal 2 refers to an unnecessary signal from a communication device other than the base station 1 being a communication target for this communication terminal 2. The interference wave includes, for example, an unnecessary signal from a neighboring base station 1 located near this base station 1.

In the wireless communication system 100 according to this embodiment, each communication terminal 2 cannot identify the location of the neighboring base station 1 located near the base station 1 communicating with itself. For this reason, each communication terminal 2 cannot identify through which transmission path (channel), an interference wave from a neighboring base station 1 located near the base station 1 communicating with itself, passes. Thus, in the adaptive array antenna scheme according to this embodiment, null steering using an algorithm that does not need the information of an interference wave, such as an LMS algorithm, is performed.

As shown in FIG. 3, the communication terminal 2 includes a radio processing unit 21 including an array antenna 23 composed of a plurality of antennas 22, and a controller 24 that controls the radio processing unit 21. The radio processing unit 21 performs an amplification process, down-conversion, A/D conversion process, and the like on each of a plurality of received signals received by the array antenna 23, to thereby generate and output a plurality of received signals of a baseband.

The radio processing unit 21 performs a D/A conversion process, up-conversion, amplification process, and the like on each of a plurality of transmission signals of a baseband generated in the controller 24, to thereby generate a plurality of transmission signals of a carrier band. Then, the radio processing unit 21 respectively inputs the generated plurality of transmission signals of the carrier band to the plurality of antennas 22 constituting the array antenna 23. As a result, a transmission signal is wirelessly transmitted from each antenna 22.

The controller 24 is composed of a CPU, DSP, memory, and the like. In the controller 24, the CPU and DSP execute a program in the memory, whereby functional blocks are generated, such as a transmission processing unit 240, a reception processing unit 241, and a reception quality acquisition unit 242.

The transmission processing unit 240 generates as many identical transmission signals as the antennas 22. After that, the transmission processing unit 240 respectively sets, for the obtained plurality of transmission signals, a plurality of transmission weights for controlling the transmission directivity of the array antenna 23. Then, the transmission processing unit 240 performs the modulation process or the like on a plurality of transmission signals in which transmission weights have been respectively set, to thereby generate a plurality of transmission signals of a baseband. After that, the transmission processing unit 240 inputs the generated plurality of transmission signal of the baseband to the radio processing unit 21. As a result, the communication terminal 2 performs null steering and beamforming on the transmission directivity of the array antenna 23, and then transmits a transmission signal to the base station 1.

In a case where the base station 1 does not use the MIMO scheme in transmission, the reception processing unit 241 respectively sets, for a plurality of received signals input from the radio processing unit 21, a plurality of reception weights for controlling the reception directivity at the array antenna 23. The reception processing unit 241 combines a plurality of received signals in which reception weights have been respectively set, to thereby generate a combined received signal. Then, the reception processing unit 241 performs a demodulation process or the like on the generated combined received signal, to thereby obtain, for example, the control data and user data included in the combined received signal. In this embodiment, the base station 1 notifies the communication terminal 2 whether or not it uses the MIMO scheme in transmission to this communication terminal 2.

The reception processing unit 241 calculates a plurality of reception weights based on a known reference signal included in the received signal from the base station 1. The reception processing unit 241 calculates a plurality of reception weights using, for example, the LMS algorithm or RLS algorithm. Then, the reception processing unit 241 respectively sets the calculated plurality of reception weights to the data signals included in a plurality of received signals output from the radio processing unit 21. Accordingly, the communication terminal 2 performs null steering and beamforming based on the reference signal from the base station 1 and receives a data signal transmitted from the base station 1. The transmission processing unit 240 calculates a plurality of transmission weights from the plurality of reception weights obtained by the reception processing unit 241.

Meanwhile, in a case where the base station 1 uses the MIMO scheme in transmission, the reception processing unit 241 performs the reception process on the received signal from the base station 1 without using the adaptive array antenna scheme. First, the reception processing unit 241 estimates a channel matrix in a transmission path between the array antenna 23 of the communication terminal 2 to which the reception processing unit 241 belongs and the array antenna 13 of the base station 1 being a communication target, based on known reference signals (complex signals) included in a plurality of received signals output from the radio processing unit 21. The channel matrix is formed of channel gains (also referred to as channel coefficients) for the number obtained by multiplying the number of a plurality of antennas 22 of the communication terminal 2 and the number of a plurality of antennas 12 of the base station 1. The reception processing unit 241 then performs, using the estimated channel matrix, a reception process such as a demodulation process on the data signals (complex signals) included in a plurality of received signals output from the radio processing unit 21. The base station 1 uses the MIMO-SDM in this embodiment, and thus, for example, maximum likelihood detection (MLD), successive interference cancellation (SIC), or MMSE is used in this reception process. This causes the communication terminal 2 to obtain user data and control data transmitted from the base station 1.

In the communication terminal 2 according to this embodiment, a communication unit 25 that communicates with the base station 1 using the array antenna 23 is formed of the radio processing unit 21, transmission processing unit 240, and reception processing unit 241. The communication unit 25 is capable of signal transmission using the adaptive array antenna scheme and signal reception using the adaptive array antenna scheme.

The reception quality acquisition unit 242 obtains a reception quality of a signal from the base station 1, based on the received signal output from the radio processing unit 21. In this embodiment, the reception quality acquisition unit 242 obtains the reception quality based on a received signal yet to be subjected to the demodulation process and obtains the reception quality based on a received signal subjected to the demodulation process. Hereinafter, the reception quality that is obtained based on the received signal yet to be subjected to the demodulation process is referred to as a "reception quality before demodulation". Meanwhile, the reception quality that is obtained based on the received signal subjected to the demodulation process is referred to as a "reception quality after demodulation".

The reception quality acquisition unit 242 calculates, for example, a carrier to interference and noise ratio (CINR) based on the received signal of the baseband output from the radio processing unit 21, as the reception quality before demodulation. The reception quality acquisition unit 242 may calculate a received signal strength indicator (RSSI) as the reception quality before demodulation.

The reception quality acquisition unit 242 calculates, for example, a signal to interference and noise power ratio (SINR) as the reception quality after demodulation, based on a received signal after the demodulation process, namely a complex symbol (hereinafter, referred to as a "demodulation complex symbol") for demodulating subcarriers included in the received OFDM signal, the complex symbol being obtained by performing a demodulation process on the received OFDM signal. An error vector magnitude (EVM) may be calculated as the reception quality after demodulation. Alternatively, the reception quality acquisition unit 242 may perform, for example, a decoding process on a demodulation complex symbol to reproduce bit data and calculate a reception error rate based on the bit data, thereby taking the resultant reception error rate as the reception quality after demodulation.

The communication terminal 2 is configured such that when the reception quality acquisition unit 242 obtains a reception quality before demodulation and a reception quality after demodulation, the reception processing unit 241 does not receive a received signal from the base station 1 using the adaptive array antenna scheme.

The transmission processing unit 240 generates a transmission signal including a reception quality notification signal for notifying the reception quality before demodulation and reception quality after demodulation obtained by the reception quality acquisition unit 242 and input the generated transmission signal to the radio processing unit 21. As a result, the communication terminal 2 transmits, to the base station 1, the reception quality notification signal for notifying the reception quality before demodulation and reception quality after demodulation obtained in the communication terminal 2.

In the base station 1, the reception quality notification signal received by the radio processing unit 11 is input to the interference intensity judgment unit 142. Based on the reception quality before demodulation and reception quality after demodulation indicated by the reception quality notification signal input, the interference intensity judgment unit 142 judges whether or not the intensity (hereinafter, referred to as "interference intensity") of an interference wave included in the received signal at the communication terminal 2 that transmits this reception quality notification signal is high based on predetermined criteria. Then, in the base station 1, the use prohibition determination unit 143 determines whether or not to prohibit the use of the MIMO scheme based on the judgment results of the interference intensity judgment unit 142. Hereinafter, a series of processes in the wireless communication system 100, which ranges from the communication terminal 2 obtaining the reception quality to the base station 1 determining, based on the reception quality, whether or not to prohibit the use of the MIMO scheme in transmitting a signal to this communication terminal 2, is referred to as a "MIMO use prohibition judging process".

<MIMO Use Prohibition Judging Process in Wireless Communication System>

FIG. 4 is a flowchart showing the MIMO use prohibition judging process in the wireless communication system 100 according to the embodiment of the present invention. As shown in FIG. 4, in the communication terminal 2, in Step s1, the reception quality acquisition unit 242 obtains the CINR as the reception quality before demodulation. Next, in Step s2, the reception quality acquisition unit 242 obtains the SINR as the reception quality after demodulation. Then, in Step s3, the transmission processing unit 240 generates a reception quality notification signal for notification of the reception quality before demodulation (CINR) and reception quality after demodulation (SINR) obtained by the reception quality acquisition unit 242. This reception quality notification signal is transmitted to the base station 1 being a communication target by the radio processing unit 21. The CINR and SINR are notified the base station 1 from the communication terminal 2 as, for example, a channel quality indicator (CQI). The communication terminal 2 may perform the process from Steps s1 to s3 based on an instruction from the base station 1 or may perform the process regularly or irregularly without an instruction from the base station 1.

In the base station 1, the radio processing unit 11 receives the reception quality notification signal from the communication terminal 2, and then, in Step s4, the interference intensity judgment unit 142 judges whether or not the interference intensity at the communication terminal 2 is high based on the CINR and SINR indicated by the reception quality notification signal. FIG. 5 is a diagram for describing an operation at the interference intensity judgment unit 142.

The interference intensity judgment unit 142 deals with a two-dimensional coordinate system 300 showing the CINR and SINR by horizontal and vertical axes, respectively, as shown in FIG. 5. The interference intensity judgment unit 142 compares a threshold straight line 310 upward to the right, which is shown in the two-dimensional coordinate system 300, and a position of a coordinate value 320 represented by the CINR and SINR indicated by the reception quality notification signal in the two-dimensional coordinate system 300. The interference intensity judgment unit 142 judges that the interference wave intensity at the communication terminal 2 is low in a case where the coordinate value 320 is located above the threshold straight line 310. In other words, the interference intensity judgment unit 142 judges that the interference wave intensity at the communication terminal 2 is low in a case where on the threshold straight line 310, the SINR of the coordinate value 320 is larger than the SINR with the CINR being identical to the CINR of the coordinate value 320.

Meanwhile, in a case where the coordinate value 320 is located below the threshold straight line 310 as shown in FIG. 5, the interference intensity judgment unit 142 judges that the interference wave intensity at the communication terminal 2 is high. In other words, the interference intensity judgment unit 142 judges that the interference wave intensity at the communication terminal 2 is high in a case where on the threshold straight line 310, the SINR of the coordinate value 320 is smaller than the SINR with the CINR being identical to the CINR of the coordinate value 320.

The interference intensity judgment unit 142 may judge that the interference wave intensity at the communication terminal 2 is low or the interference wave intensity at the communication terminal 2 is high in a case where the coordinate value 320 is located on the threshold straight line 310.

As described above, the interference wave intensity at the communication terminal 2 is judged to be low in the case where the coordinate value 320 is located above the threshold straight line 310 upward to the right, or the interference wave intensity at the communication terminal 2 is judged to be high in the case where the coordinate value 320 is located below the threshold straight line 310 upward to the right. As a result, in a case of a poor reception quality before the demodulation process at the communication terminal 2, the interference wave intensity at the communication terminal 2 is judged to be low if the reception quality after demodulation at the communication terminal 2 is not very good. In a case of a good reception quality before the demodulation process at the communication terminal 2, the interference wave intensity at the communication terminal 2 is judged to be high even if the reception quality after demodulation at the communication terminal 2 is good to some extent.

From another perspective of the process by the interference intensity judgment unit 142, it is conceivable that the interference intensity judgment unit 142 could compare the SINR at the communication terminal 2 with a threshold that varies in accordance with the CINR at the communication terminal 2. Then, the interference intensity judgment unit 142 judges that the interference wave intensity at the communication terminal 2 is low if the SINR is larger than the threshold. Meanwhile, the interference intensity judgment unit 142 judges that the interference wave intensity at the communication terminal 2 is high if the SINR is smaller than the threshold. The threshold to be compared with the SINR at the communication terminal 2 is set to be larger as the CINR at the communication terminal 2 becomes higher.

The threshold straight line 310 used by the interference intensity judgment unit 142 is determined based on a predicted straight line 350 showing the relationship between the CINR and SINR at the communication terminal 2, which is predicted in a case where the received signal at the communication terminal 2 is assumed to include no interference wave. In this embodiment, the threshold straight line 310 is set to be located slightly below the predicted straight line 350.

Also in a case where the communication terminal 2 obtains the RSSI as the reception quality before demodulation and obtains the SINR as the reception quality after demodulation, whether or not the interference wave intensity at the communication terminal 2 is high can be judged in a similar manner. In this case, a two-dimensional coordinate system showing the RSSI and SINR by horizontal and vertical axes, respectively, is used in place of the two-dimensional coordinate system 300.

Figure 6:
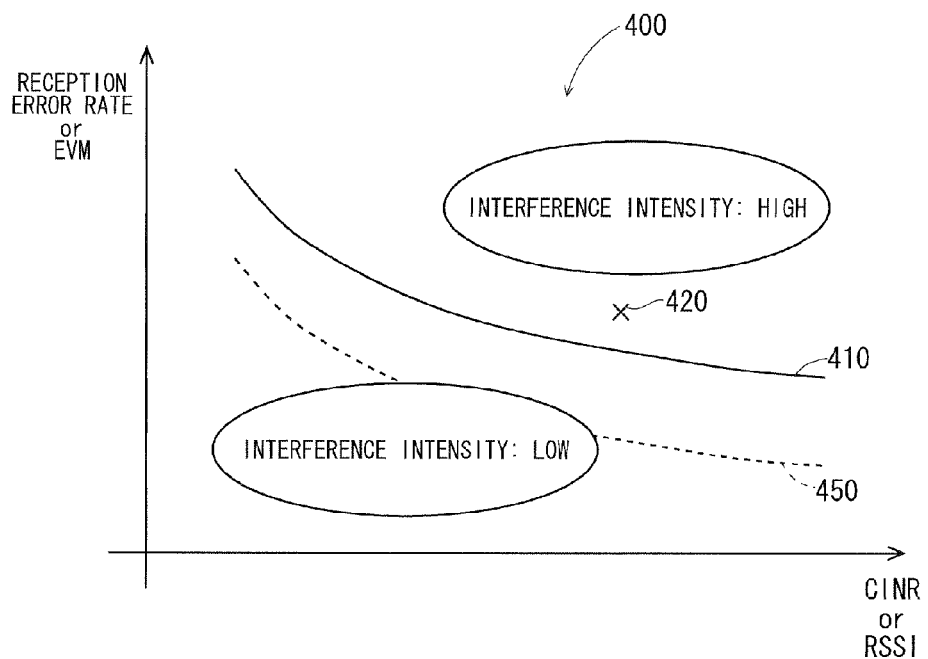
FIG. 6 is another diagram for describing the operation of the interference intensity judgment unit.

In a case where the communication terminal 2 obtains the CINR or RSSI as the reception quality before demodulation and obtains the reception error rate or EVM as the reception quality after demodulation, not a threshold straight line upward to the right but a threshold curve downward to the right is used. FIG. 6 is a diagram for describing the operation of the interference intensity judgment unit 142 in this case.

As shown in FIG. 6, the interference intensity judgment unit 142 deals with a two-dimensional coordinate system 400 showing the CINR or RSSI and the reception error rate or EVM by horizontal and vertical axes, respectively. The interference intensity judgment unit 142 compares a threshold curve 410 (more specifically, the threshold curve 410 having a smaller vertical-axis value as the horizontal-axis value becomes larger) downward to the right, which is shown in the two-dimensional coordinate system 400, and a position of a coordinate value 420 represented by the CINR (or RSSI) and the reception error rate (or EVM) indicated by the reception quality notification signal in the two-dimensional coordinate system 400. In a case where the coordinate value 420 is located above the threshold curve 410 as shown in FIG. 6, the interference intensity judgment unit 142 judges that the interference wave intensity at the communication terminal 2 is high. Meanwhile, in a case where the coordinate value 420 is located below the threshold curve 410, the interference intensity judgment unit 142 judges that the interference wave intensity at the communication terminal 2 is low. In a case where the coordinate value 420 is located on the threshold curve 410, the interference intensity judgment unit 142 may judge that the interference wave intensity at the communication terminal 2 is low or may judge that the interference wave intensity at the communication terminal 2 is high.

From another perspective of the above-mentioned process by the interference intensity judgment unit 142, it is conceivable that the interference intensity judgment unit 142 could compare the reception error rate or EVM at the communication terminal 2 with a threshold that varies in accordance with the CINR or RSSI at the communication terminal 2. Then, the interference intensity judgment unit 142 judges that the interference wave intensity at the communication terminal 2 is low if the reception error rate or EVM is smaller than the threshold. Meanwhile, the interference intensity judgment unit 142 judges that the interference wave intensity at the communication terminal 2 is high if the reception error rate or EVM is larger than the threshold. The threshold to be compared with the reception error rate or EVM at the communication terminal 2 is set to be smaller as the CINR or RSSI at the communication terminal 2 becomes higher.

The threshold curve 410 used by the interference intensity judgment unit 142 is determined based on a predicted curve 450 showing the relationship between the CINR (or RSSI) and the reception error rate (or EVM) at the communication terminal 2, which is predicted in a case where the received signal at the communication terminal 2 is assumed to include no interference wave. In this embodiment, the threshold curve 410 is set to be located slightly above the predicted curve 450.

As described above, the base station 1 according to this embodiment judges whether or not the interference intensity at the communication terminal 2 is high based on both of the reception quality before demodulation and reception quality after demodulation at the communication terminal 2. Accordingly, whether or not the interference wave intensity at the communication terminal 2 is high can be judged more properly. This will be described below.

As to the reception quality after demodulation such as the SINR at the communication terminal 2, it may become poor for a large distance between the communication terminal 2 and base station 1 even in a case where the interference wave intensity at the communication terminal 2 is low. Thus, also in a case of a poor reception quality after demodulation at the communication terminal 2, the interference intensity at the communication terminal 2 is low in some cases. Also, as to the reception quality after demodulation at the communication terminal 2, it may become good for a small distance between the communication terminal 2 and base station 1 even in a case where the interference wave intensity at the communication terminal 2 is high. Thus, also in a case of a good reception quality after demodulation at the communication terminal 2, the interference intensity at the communication terminal 2 is high in some cases.

As described above, the interference intensity at the communication terminal 2 may be low even for a poor reception quality after demodulation at the communication terminal 2, or the interference intensity at the communication terminal 2 may be high even for a good reception quality after demodulation at the communication terminal 2. Thus, unlike this embodiment, in the case where it is judged whether or not the interference intensity at the communication terminal 2 is high with reference to only the reception quality after demodulation at the communication terminal 2, the judgment accuracy does not become very high.

Meanwhile, the reception quality before demodulation such as the CINR at the communication terminal 2 is good for a small distance between the communication terminal 2 and base station 1, or the reception quality before demodulation at the communication terminal 2 becomes poor for a large distance between the communication terminal 2 and base station 1.

In this embodiment, thus, it is judged whether or not the interference intensity at the communication terminal 2 is high not only based on the reception quality after demodulation at the communication terminal 2 but also based on the reception quality before demodulation at the communication terminal 2. Specifically, for a poor reception quality before the demodulation process at the communication terminal 2, the distance between the communication terminal 2 and base station 1 is judged to be large, and the interference wave intensity at the communication terminal 2 is judged to be low even if the reception quality after demodulation at the communication terminal 2 is not very good. Meanwhile, for a good reception quality before the demodulation process at the communication terminal 2, the distance between the communication terminal 2 and base station 1 is judged to be small, and the interference wave intensity at the communication terminal 2 is judged to be high even if the reception quality after demodulation at the communication terminal 2 is good to some extent. This allows for correct judgment whether or not the interference wave intensity at the communication terminal 2 is high.

Referring back to FIG. 4, when the interference intensity judgment unit 142 judges that the interference intensity at the communication terminal 2 is high in Step s4, in Step s5, the use prohibition determination unit 143 prohibits the use of the MIMO scheme when transmitting a signal to the communication terminal 2. Meanwhile, when the interference intensity judgment unit 142 judges that the interference intensity at the communication terminal 2 is low (is not high) in Step s4, the use prohibition determination unit 143 does not prohibit the use of the MIMO scheme when transmitting a signal to the communication terminal 2.

When the use prohibition determination unit 143 prohibits the use of the MIMO scheme when transmitting a signal to the communication terminal 2, the communication unit 15 does not use the MIMO scheme but use the adaptive array antenna scheme when transmitting a signal to the communication terminal 2.

While the communication unit 15 uses the adaptive array antenna scheme in transmission when not using the MIMO scheme in transmission in this embodiment, the communication unit 15 may perform omni-transmission without using the adaptive array antenna scheme.

<Method of Adjusting Transmission Throughput at Base Station>

Next, a method of adjusting a transmission throughput at the base station 1 will be described. In the wireless communication system 100 according to this embodiment, M (M≥2) MCSs which have different combinations of modulation schemes and code rates are defined. In the LTE, 29 MCSs are defined. The M MCSs are respectively provided with ranks from stage zero to stage (M−1), and as the rank becomes higher, a momentary transmission throughput of the base station 1, which is determined in accordance with the combination of a modulation scheme and a code rate in the MCS corresponding to the rank, becomes higher. The transmission processing unit 140 determines an MCS to be applied to the transmission signal that is transmitted from the communication unit 15 to the communication terminal 2, from the M MCSs based on the CQI from the communication terminal 2. In other words, the transmission processing unit 140 determines an MCS to be applied to the transmission signal that is transmitted from the communication unit 15 to the communication terminal 2, based on the reception quality at the communication terminal 2. As the reception quality at a communication terminal 2 becomes better, the transmission processing unit 140 applies an MCS of a higher rank to the transmission signal to be transmitted to the communication terminal 2.

When the transmission processing unit 140 determines an MCS to be applied to the transmission signal to the communication terminal 2, the communication unit 15 notifies the communication terminal 2 of this MCS. At the communication terminal 2, the reception processing unit 241 performs a reception process according to the MCS notified from the base station 1 on a received signal from the base station 1, to thereby obtain data included in the received signal.

When notifying a communication terminal 2 of an MCS to be applied to a transmission signal that is transmitted to the communication terminal 2, the base station 1 notifies whether or not it uses the MIMO scheme when transmitting a signal to the communication terminal 2.

The transmission processing unit 140 adjusts an MCS to be applied to a transmission signal. The method of adjusting an MCS will be descried below.

In this embodiment, when the communication unit 25 receives a signal from the base station 1 in each communication terminal 2, the reception processing unit 241 generates ACK/NACK information indicating whether or not it has properly obtained the data included in the received signal. The ACK/NACK information is included in the transmission signal and is then notified the base station 1 from the communication unit 25. The transmission processing unit 140 of the base station 1 observes the ACK/NACK information notified from the communication terminal 2 and calculates a reception error rate at the communication terminal 2. Then, in a case where the reception error rate for the communication terminal 2 is high or low, the transmission processing unit 140 changes an MCS to be applied to a transmission signal that is transmitted to this communication terminal 2. For example, in a case of a high reception error rate for a communication terminal 2, namely in a case of a reception error rate larger than a first threshold, the transmission processing unit 140 decreases, by one, the rank of the MCS applied to the transmission signal that is transmitted to the communication terminal 2. In a case of a low reception error rate for a communication terminal 2, namely in a case of a reception error rate smaller than a second threshold (<first threshold), the transmission processing unit 140 increases, by one, the rank of the MCS applied to the transmission signal to be transmitted to the communication terminal 2.

As described above, for a high reception error rate at a communication terminal 2, the transmission processing unit 140 decreases, by one, the rank of the MCS to be applied to the transmission signal that is transmitted to the communication terminal 2. For a low reception error rate at a communication terminal 2, the transmission processing unit 140 increases, by one, the rank of the MCS to be applied to the transmission signal that is transmitted to the communication terminal 2. Through the above, the reception error rate at the communication terminal 2 falls within a predetermined range.

While the base station 1 obtains a reception error rate at the communication terminal 2 in the example above, as described above, the communication terminal 2 may obtain a reception error rate as the reception quality after demodulation and notify the base station 1. In this case, the base station 1 may determine the rank of an MCS to be applied to a transmission signal to a communication terminal 2 based on a reception error rate notified from the communication terminal 2.

In a case where the base station 1 according to this embodiment starts communication with a communication terminal 2, first, the communication unit 15 starts communication with the communication terminal 2 without using the MIMO scheme. Then, in a case where, as a result of the adjustment of an MCS to be applied to a transmission signal to the communication terminal 2 by the transmission processing unit 140, the rank of the MCS reaches the highest rank, namely (M−1) rank, the reception error rate at the communication terminal 2 is smaller than a second threshold, and the use of the MIMO scheme in transmission of a signal to the communication terminal 2 is not prohibited, the communication unit 15 uses the MIMO scheme (MIMO-SDM) when transmitting a signal to the communication terminal 2 for further improving the transmission throughput of the base station 1. Hereinafter, the transmission scheme for transmitting a signal without using the MIMO scheme may also be referred to as a "non-MIMO scheme".

The communication unit 15 that transmits a signal to a communication terminal 2 using the MIMO scheme avoids using the MIMO scheme in transmitting a signal to the communication terminal 2 when the reception error rate at the communication terminal 2 exceeds the first threshold. In other words, the communication unit 15 switches the transmission scheme from the MIMO scheme to the non-MIMO scheme. Then, in a case where the rank of an MCS to be applied to a transmission signal to the communication terminal 2 is the highest rank, the communication unit 15 uses the MIMO scheme (MIMO-SDM) when transmitting a signal to the communication terminal 2 when the reception error rate at the communication terminal 2 falls below the second threshold. In other words, the communication unit 15 switches the transmission scheme from the non-MIMO scheme to the MIMO scheme. Hereinafter, the base station 1 operates in a similar manner.

As described above, the base station 1 combines an MCS to be applied to a transmission signal to the communication terminal 2 with whether or not to use the MIMO scheme (MIMO-SDM) when transmitting a signal to the communication terminal 2, to thereby properly adjust a transmission throughput for the communication terminal 2.

In a case where the use prohibition determination unit 143 prohibits the use of the MIMO scheme when transmitting a signal to a communication terminal 2, the communication unit 15 does not use the MIMO scheme when transmitting a signal to the communication terminal 2 even in a case where an MCS to be applied to a transmission signal to the communication terminal 2 reaches the highest rank and thus the reception error rate at the communication terminal 2 is smaller than the second threshold. In other words, the communication unit 15 does not change the transmission scheme from the non-MIMO scheme to the MIMO scheme.

When communicating with a communication terminal 2, the base station 1 may first use the transmission diversity such as MIMO-STC or MIMO-SFBC to transmit a signal to the communication terminal 2. Then, when the rank of the MCS to be applied to the transmission signal to the communication terminal 2 reaches the highest rank, the base station 1 may use the MIMO-SDM in transmission to the communication terminal 2.

As described above, for a high intensity of an interference wave included in a received signal at a communication terminal 2, the base station 1 according to this embodiment prohibits the use of the MIMO scheme when transmitting a signal to the communication terminal 2. For a high interference intensity at a communication terminal 2, the intensity of the interference wave included in the reference signal from the base station 1, which is received by the communication terminal 2, becomes higher, and accordingly, the accuracy of a channel matrix that is estimated by the communication terminal 2 based on the reference signal degrades. Therefore, for a high interference intensity at the communication terminal 2, when a signal is transmitted to the communication terminal 2 using the MIMO scheme, the communication terminal 2 performs a reception process on a data signal from the base station 1 based on a channel matrix whose accuracy is not good and thus cannot properly obtain the data included in the data signal. In other words, the reception error rate at the communication terminal 2 increases. In this embodiment, the use of the MIMO scheme when transmitting a signal to a communication terminal 2 is prohibited in a case where the interference intensity at the communication terminal 2 is high, which does not cause such a problem. As a result, the communication terminal 2 can properly obtain data included in the data signal from the base station 1. In other words, the reception error rate at the communication terminal 2 decreases. This results in an improvement in communication performance between the base station 1 and communication terminal 2.

In a case where the base station 1 adjusts a transmission throughput as described above, if a communication terminal 2 has a high interference wave intensity, the use of the MIMO scheme when transmitting a signal to the communication terminal 2 is not prohibited. In this case, the MCS to be applied to the transmission signal to a communication terminal 2 reaches the highest rank in a situation where the interference intensity at the communication terminal 2 is high, and the transmission scheme of the base station 1 is switched from the non-MIMO scheme to the MIMO scheme in a case where the reception error rate at the communication terminal 2 is smaller than the second threshold. As a result, the communication terminal 2 performs a reception processes on a signal from the base station 1 based on a channel matrix having poor accuracy. This results in an increase in reception error rate at the communication terminal 2.

Upon an increase in reception error rate at the communication terminal 2, the base station 1 switches the transmission scheme from the MIMO scheme to the non-MIMO scheme. Accordingly, the communication terminal 2 receives a signal from the base station 1 using the adaptive array antenna scheme. In a case where the communication terminal 2 receives a signal from the base station 1 using the adaptive array antenna scheme, the intensity of the interference wave included in the received signal can be reduced, leading to a decrease in reception error rate at the communication terminal 2.

Upon a decrease in reception error rate at the communication terminal 2, the base station 1 again switches the transmission scheme from the non-MIMO scheme to the MIMO scheme. Switching of the transmission scheme from the non-MIMO scheme to the MIMO scheme by the base station 1 increases a reception error rate at the communication terminal 2 in a similar manner. As a result, the base station 1 switches the transmission scheme from the MIMO scheme to the non-MIMO scheme. After that, the base station 1 repeats a similar operation.

As described above, if the use of the MIMO scheme is not prohibited when transmitting a signal to a communication terminal 2 in a case of a high interference wave intensity at the communication terminal 2, switching from the non-MIMO scheme to the MIMO scheme and switching from the MIMO scheme to the non-MIMO scheme frequently occur in an alternate manner in the base station 1, which destabilizes the operation of the base station 1. This results in a decrease in communication performance between the base station 1 and communication terminal 2.

In this embodiment, for a high interference wave intensity at the communication terminal 2, the base station 1 prohibits the use of the MIMO scheme when transmitting a signal to the communication terminal 2. This prevents the frequent occurrence of switching from the non-MIMO scheme to the MIMO scheme and switching from the MIMO scheme to the non-MIMO scheme in an alternate manner in the base station 1. This prevents the base station 1 from operating unstably. As a result, the communication performance between the base station 1 and communication terminal 2 can be improved.

The communication terminal 2 according to this embodiment does not receive a data signal from the base station 1 using the adaptive array antenna scheme in a case where the base station 1 uses the MIMO scheme in transmission to the communication terminal 2, which allows the communication terminal 2 to properly receive a signal transmitted by the base station 1 using the MIMO scheme. This will be described below in detail.

When the base station 1 transmits a signal using the MIMO scheme, the transmission of a plurality of different reference signals from a plurality of antennas 12 of the base station 1 using the same resources (same frequency band and same transmission time slot) is avoided such that the communication terminal 2 can properly estimate a channel matrix using a reference signal from the base station 1.

Meanwhile, as to a data signal transmitted by the base station 1 using the MIMO scheme, a plurality of different data signals are transmitted from the plurality of antennas 12 using the same radio resources. For example, in the MIMO-SDM, a plurality of different data signals that respectively belong to a plurality of different systems are transmitted from the plurality of antennas 12 using the same radio resources. In the MIMO-STC or MIMO-SFBC, a data signal belonging to one system and a complex conjugate signal belonging to the other system are transmitted using the same radio resources from the plurality of antennas 12.

Figure 7:
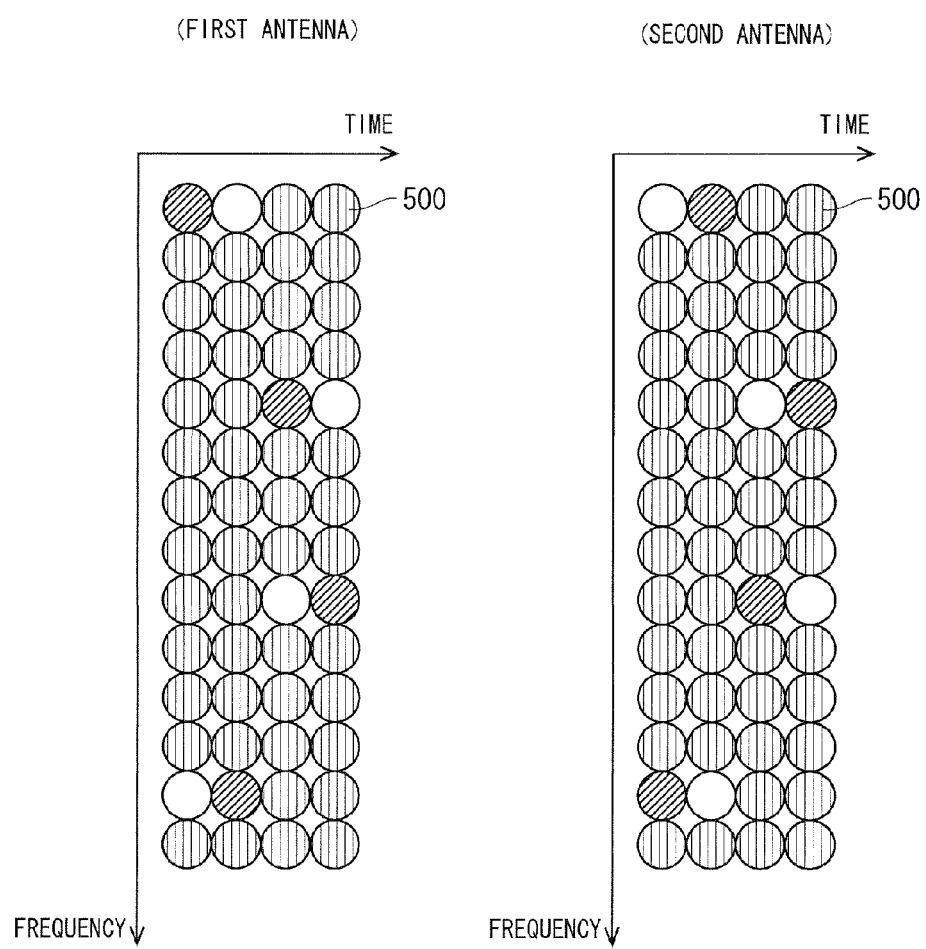
FIG. 7 is a diagram showing exemplary radio resources that are used when each antenna transmits reference signals and data signals.

FIG. 7 is a diagram showing exemplary radio resources that are used when each antenna 12 transmits reference signals and data signals. FIG. 7 shows, by circles, unit radio resources 500 including one subcarrier in the frequency direction and including one OFDM symbol period in the time direction. In FIG. 7, the circles indicating the unit radio resources 500 that are used in transmission of reference signals are diagonally shaded, the circles indicating the unit radio resources 500 that are used in transmission of data signals are vertically shaded, and the circles indicating the unit radio resources 500 that are not used in signal transmission are not hatched. FIG. 7 shows one antenna 12 included in the base station 1 as a "first antenna" and the other antenna 12 included in the base station 1 as a "second antenna". The left side of FIG. 7 shows exemplary radio resources that are used when the first antenna transmits signals, and the right side of FIG. 7 shows exemplary radio resources that are used when the second antenna transmits signals.

In the example of FIG. 7, the second antenna does not transmit signals using the unit radio resources 500 same as the unit radio resources 500 that are used in transmission of reference signals by the first antenna, and the first antenna does not transmit signals using the unit radio resources 500 same as the unit radio resources 500 that are used in transmission of reference signals by the second antenna. In other words, a reference signal that is transmitted from the base station 1 using a certain unit radio resource 500 is transmitted from only one of the first and second antennas.

Unlike the example of FIG. 7, in the base station 1, the same plurality of reference signals may be transmitted using the same radio resources from the plurality of antennas 12.

As described above, in the base station 1, a mode of transmitting a reference signal for estimating a channel matrix and a mode of transmitting a data signal differ from each other when transmitting a signal using the MIMO scheme.

Meanwhile, in a case where the communication terminal 2 properly receives, using the adaptive array antenna scheme, data signals transmitted by the base station 1 using the MIMO scheme, the communication terminal 2 needs to control the reception directivity at the plurality of antennas 22 to individually receive a plurality of different data signals transmitted from the plurality of antennas 12 included in the base station 1. In other words, for each of a plurality of antennas 12 of the base station 1, the communication terminal 2 needs to direct a beam toward a data signal transmitted from one antenna 12 and direct null toward a data signal transmitted from the other antenna 12.

However, in the base station 1, a mode of transmitting a reference signal and a mode of transmitting a data signal differ from each other when the MIMO scheme is used. Thus, even if performing null steering for the reception directivity at the plurality of antennas 22 based on the reference signal transmitted from the base station 1, for each of a plurality of antennas 12 included in the base station 1, the communication terminal 2 cannot direct a beam toward a data signal transmitted from one antenna 12 and direct null toward a data signal transmitted from the other antenna 12. Therefore, the communication terminal 2 cannot properly receive, using the adaptive array antenna scheme, a data signal transmitted from the base station 1 using the MIMO scheme.

In the example of FIG. 7, in the base station 1, when a reference signal is transmitted from one antenna 12, a signal is not transmitted from the other antenna 12. For this reason, even if performing null steering and beamforming based on a reference signal transmitted from one antenna 12, the communication terminal 2 can direct a beam toward a data signal transmitted from the one antenna 12 but cannot direct null toward a data signal transmitted from the other antenna 12. The communication terminal 2 accordingly receives the data signal transmitted from one antenna 12 of the base station 1 as well as the data signal transmitted from the other antenna 12 of the base station 1 as an unnecessary signal, and cannot properly receive the data signal transmitted from the one antenna 12.

This embodiment is therefore configured such that the communication terminal 2 does not receive a data signal from the base station 1 using the adaptive array antenna scheme in a case where the base station 1 uses the MIMO scheme in transmission to this communication terminal 2. This enables the communication terminal 2 to properly receive a signal transmitted by the base station 1 using the MIMO scheme. This results in an improvement in communication performance between the base station 1 and communication terminal 2.

<Various Modifications>
<First Modification>

In the example above, in a case where the interference intensity at a communication terminal 2 is high, a base station 1 immediately prohibits the use of the MIMO scheme in transmission to the communication terminal 2. However, the base station 1 may prohibit the use of the MIMO scheme in transmission to this communication terminal 2 for the first time in a case where the interference intensity at a communication terminal 2 is high and also in a case where the reception quality at the communication terminal 2 is not good (is poor). This modification will be described below.

FIG. 8 is a block diagram showing a configuration of a base station 1 included in a wireless communication system 100 according to this modification. As shown in FIG. 8, in the base station 1 according to this modification, a controller 14 further includes a reception quality judgment unit 144 as a functional block. The reception quality judgment unit 144 judges whether or not the reception quality at a communication terminal 2 is good based on predetermined criteria.

Figure 9:
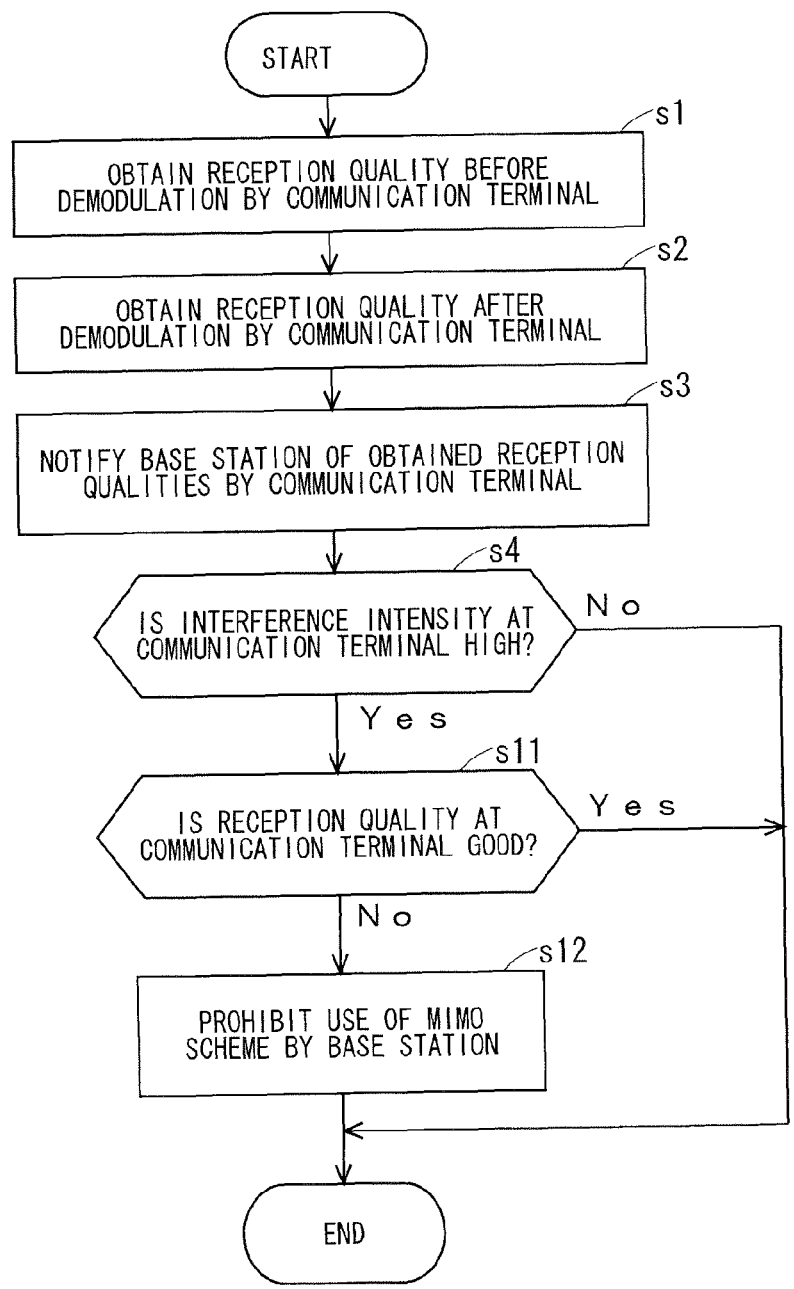
FIG. 9 is a flowchart showing an operation of a modification of the wireless communication system.

FIG. 9 is a flowchart showing a MIMO use prohibition judging process in the wireless communication system 100 according to this modification. As shown in FIG. 9, in the MIMO use prohibition judging process according to this modification, Steps s1 to 3 described above are performed. After that, in Step s4, an interference intensity judgment unit 142 of the base station 1 judges that the interference intensity at the communication terminal 2 is not high, and then, a use prohibition determination unit 143 does not prohibit the use of the MIMO scheme when transmitting a signal to the communication terminal 2, whereby the MIMO use prohibition judging process ends.

Meanwhile, in Step s4, the interference intensity judgment unit 142 judges that the interference intensity at the communication terminal 2 is high, and then, in Step s11, the reception quality judgment unit 144 of the base station 1 judges whether or not the reception quality at the communication terminal 2 is good based on predetermined criteria. The reception quality at the communication terminal 2 here is not the reception quality used in Step s4 but the reception quality at the communication terminal 2 after the interference intensity judgment unit 142 judges that the interference intensity at the communication terminal 2 is high. In other words, the reception quality at a communication terminal 2 refers to the reception quality at the communication terminal 2 when the interference intensity at the communication terminal 2 is high.

In Step s11, the reception quality before demodulation obtained in the communication terminal 2 may be used or the reception quality after demodulation obtained in the communication terminal 2 may be used. In a case where, for example, the CINR obtained by the communication terminal 2 is used in Step s11, the reception quality judgment unit 144 compares the CINR obtained by the communication terminal 2 with a predetermined threshold. Then, the reception quality judgment unit 144 judges that the reception quality at the communication terminal 2 is good in a case where the CINR is larger than the predetermined threshold or judges that the reception quality at the communication terminal 2 is not good (is poor) in a case where the CINR obtained by the communication terminal 2 is smaller than the predetermined threshold. In a case where the CINR matches the predetermined threshold, the reception quality judgment unit 144 may judge that the reception quality at the communication terminal 2 is good or is not good.

In a case where, for example, the EVM obtained by the communication terminal 2 is used in Step s11, the reception quality judgment unit 144 compares the EVM obtained by the communication terminal 2 with a predetermined threshold. The reception quality judgment unit 144 judges that the reception quality at the communication terminal 2 is good in a case where the EVM obtained by the communication terminal 2 is smaller than the predetermined threshold or judges that the reception quality at the communication terminal 2 is not good (is poor) in a case where the EVM obtained by the communication terminal 2 is larger than the predetermined threshold. In a case where the EVM matches the predetermined threshold, the reception quality judgment unit 144 may judge that the reception quality at the communication terminal 2 is good or is not good.

In Step s11, the reception quality judgment unit 144 may calculate the reception error rate for the communication terminal 2 based on the ACK/NACK information notified from the communication terminal 2 to judge whether or not the reception quality at the communication terminal 2 is good based on the calculated reception error rate.

When it is judged in Step s11 that the reception quality at the communication terminal 2 is good, the use prohibition determination unit 143 does not prohibit the use of the MIMO scheme when transmitting a signal to this communication terminal 2, whereby the MIMO use prohibition judging process ends.

Meanwhile, when it is judged in Step s11 that the reception quality at the communication terminal 2 is not good, the use prohibition determination unit 143 prohibits the use of the MIMO scheme when transmitting a signal to the communication terminal 2.

As described above, in this modification, in a case where the reception quality at the communication terminal 2 is good, the use of the MIMO scheme in transmission to the communication terminal 2 is not prohibited even when the interference intensity at the communication terminal 2 is high. This prevents a situation in which the use of the MIMO scheme when transmitting a signal to the communication terminal 2 is prohibited although the reception quality at the communication terminal 2 is good. Thus, the base station 1 can use the MIMO scheme more properly, resulting in a further improvement in communication quality between the base station 1 and communication terminal 2.

<Second Modification>

In a case where a base station 1 uses the MIMO scheme in transmission, a communication terminal 2 may use the adaptive array antenna scheme when receiving reference signals for obtaining a channel matrix from the base station 1. This modification will be described below.

Figure 10:
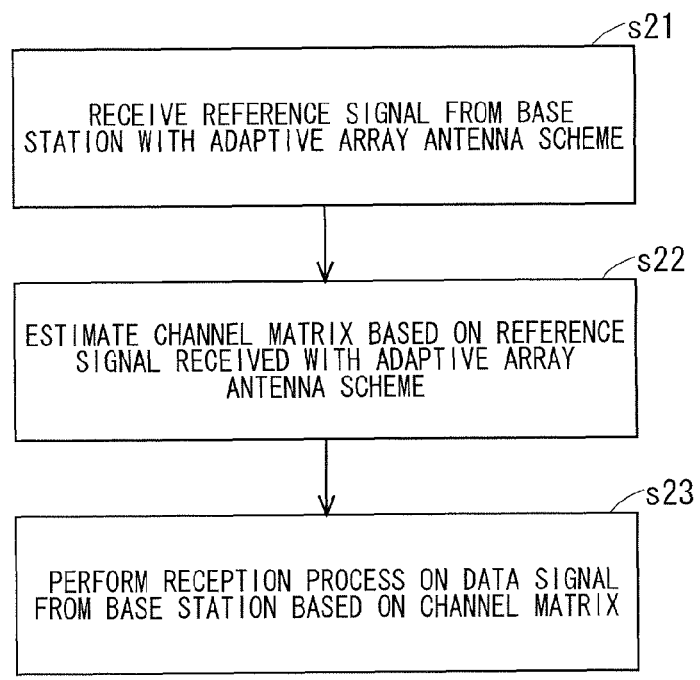
FIG. 10 is a flowchart showing an operation of a modification of the communication terminal.

FIG. 10 is a flowchart showing an operation of a communication terminal 2 in a case where a base station 1 uses the MIMO scheme when transmitting a signal to the communication terminal 2.

As shown in FIG. 10, in the communication terminal 2 to which a signal is transmitted from the base station 1 using the MIMO scheme, in Step s21, a communication unit 25 receives a reference signal from the base station 1 using the adaptive array antenna scheme. In Step s21, first, a reception processing unit 241 of the communication unit 25 calculates a plurality of reception weights for controlling the reception directivity at an array antenna 23, based on the reference signal from the base station 1. Then, the reception processing unit 241 respectively sets the calculated plurality of reception weights to the plurality of reference signals received at a plurality of antennas 22. After that, the reception processing unit 241 combines the plurality of reference signals in which the plurality of reception weights have been set, to thereby generate a combined signal. The combined signal is referred to as an "array received reference signal". Thus, the communication unit 25 performs null steering and beamforming for the reception directivity at the plurality of antennas 22, to thereby receive the reference signal from the base station 1.

The reception weight may be set to the reference signal used when a reception weight is obtained, or the reception weight may be set to a reference signal different from the above-mentioned reference signal.

In Step s22, next, the reception processing unit 241 estimates a channel matrix of a desired wave based on the array received reference signal generated in Step s21, that is, based on the reference signal received using the adaptive array antenna scheme. The method of estimating a channel matrix of a desired wave will be described below.

When y represents the array received reference signal, X represents a received reference signal vector composed of a plurality of reference signals respectively received by the plurality of antennas 22, and W represents a reception weight vector composed of a plurality of reception weights respectively set in the plurality of reference signals, an array received reference signal y is expressed by Equation (1) below.

$$y = W \times X \quad (1)$$

The received reference signal vector X is expressed by Equation (2) below.

$$X = Ht \times St + H1 \times U1 + \ldots + HL \times UL + N \quad (2)$$

St represents a signal vector of a desired wave, and Ui ($1 \leq i \leq L$) represents a signal vector of an interference wave. Ht represents a channel matrix of the desired wave, and Hi represents a channel matrix of the interference wave. N represents a signal vector of an internal noise.

Equation (3) below is obtained by rewriting Equation (1) using Equation (2).

$$y = W \times (Ht \times St + H1 \times U1 + \ldots + HL \times UL + N) \quad (3)$$

Here, W and N have a weak correlation, and thus, W×N results in a value approaching zero. W is for directing null for the reception directivity at the array antenna 23 toward an interference wave, so that W×Hi×Ui results in a small value. Thus, Equation (3) is rewritten by Equation (4) below.

$$y \approx W \times Ht \times St \quad (4)$$

The reception processing unit 241 has already known a signal vector St of a desired wave, namely of an ideal value (original value) of a reference signal to be transmitted by the base station 1 and can obtain an array received reference signal y and a reception weight vector W, whereby the reception processing unit 241 estimates a channel matrix Ht of a desired wave using those values and Equation (4).

Next, in Step s23, the reception processing unit 241 performs a reception process such as a demodulation process on the data signal from the base station 1 using a channel matrix of a desired wave estimated in Step s22. As a result, the communication terminal 2 obtains user data and control data transmitted from the base station 1.

As described above, in this modification, the communication terminal 2 performs null steering for the reception directivity at the plurality of antennas 22 and receives reference signals from the base station 1, and thus can estimate a channel matrix of a desired wave based on a reference signal having a low-intensity interference wave included in the reference signals. A highly accurate channel matrix can be accordingly obtained. Thus, a reception process is performed on a data signal from the base station 1 using this channel matrix, so that the data included in the data signal can be properly obtained. This results in a further improvement in communication performance between the base station 1 and communication terminal 2.

For a combination of the first modification described above and this modification, the base station 1 desirably judges whether or not the reception quality at the communication terminal 2 is good based on a reception error rate for the data obtained by executing Step s23 by the communication terminal 2 in Step s11 described above.

<Third Modification>

In a case where a communication terminal 2 can transmit a signal to the base station 1 using the MIMO scheme, a base station 1 may determine whether or not to prohibit the use of the MIMO scheme at the communication terminal 2 based on the intensity of an interference wave included in a received signal from the communication terminal 2.

When the communication terminal 2 transmits a signal using the MIMO scheme, the base station 1 may avoid the use of the adaptive array antenna scheme when receiving a signal from the communication terminal 2.

This modification will be described below. In this modification, a "communication terminal 2" means a "communication terminal 2 capable of transmitting a signal using the MIMO scheme" unless otherwise noted. The MIMO scheme used by the communication terminal 2 is, for example, a MIMO-SDM.

FIG. 11 is a diagram showing a configuration of a base station 1 according to this modification. As shown in FIG. 11, in the base station 1 according to this modification, a controller 14 further includes a reception quality acquisition unit 145.

The reception quality acquisition unit 145 operates similarly to a reception quality acquisition unit 242 included in the communication terminal 2. The reception quality acquisition unit 145 obtains a reception quality before demodulation and a reception quality after demodulation for the communication terminal 2 based on a received signal output from a radio processing unit 11. The reception quality acquisition unit 145 calculates, for example, a CINR or RSSI as the reception quality before demodulation. The reception quality acquisition unit 145 also calculates, for example, an SINR, EVM, or reception error rate as the reception quality after demodulation. The base station 1 is configured such that when the reception quality acquisition unit 145 obtains the reception quality before demodulation and reception quality after demodulation, a reception processing unit 141 does not receive a received signal from the communication terminal 2 using the adaptive array antenna scheme.

In the base station 1, an interference intensity judgment unit 142 not only judges whether or not the intensity of an interference wave, which is included in a received signal received from the base station 1 by the communication terminal 2, is high but also judges whether or not the intensity of the interference wave, which is included in a received signal received from the communication terminal 2 by the base station 1, is high. A use prohibition determination unit 143 determines whether or not to prohibit the use of the MIMO scheme at the base station 1 and also determines whether or not to prohibit the use of the MIMO scheme in the communication terminal 2.

The transmission throughput at the communication terminal 2 is adjusted by the base station 1. In the base station 1, as in the adjustment of a transmission throughput of the base station 1 by the transmission processing unit 140, the reception processing unit 141 first determines an MCS to be applied to a transmission signal by the communication terminal 2, based on the reception quality at the base station 1 for the signal from the communication terminal 2. Then, a communication unit 15 receives a signal from the communication terminal 2, and then, the reception processing unit 141 judges whether or not the data included in the received signal has been properly obtained, and then calculates a reception error rate for the communication terminal 2 based on the judgment results. In cases where the reception error rate for the communication terminal 2 is larger than a first threshold or is smaller than a second threshold (<first threshold), the reception processing unit 141 adjusts an MCS to be applied to the transmission signal by the communication terminal 2 as in the case where the transmission processing unit 140 adjusts an MCS to be applied to a transmission signal that is transmitted to the communication terminal 2. As a result, in the base station 1, the reception error rate for received signals from the communication terminal 2 falls within a predetermined range.

When an MCS to be applied to a transmission signal by the communication terminal 2 is determined and changed in the reception processing unit 141, the communication unit 15 notifies the communication terminal 2 of this MCS. When being notified the MCS to be used from the base station 1, the communication terminal 2 applies this MCS to a transmission signal to the base station 1.

In a case of starting communication with the communication terminal 2, the base station 1 according to this modification instructs this communication terminal 2 not to use the MIMO scheme. Then, in a case where as a result of the reception processing unit 141 adjusting an MCS to be applied to a transmission signal by the communication terminal 2, the rank of the MCS reaches the highest rank, a reception error rate for signals from the communication terminal 2 is smaller than the second threshold, and the communication terminal 2 is not prohibited from using the MIMO scheme when transmitting a signal, the communication unit 15 instructs the communication terminal 2 to use the MIMO scheme (MIMO-SDM) in transmission for further improving the transmission throughput of the communication terminal 2. In the communication terminal 2, when the use of the MIMO scheme in transmission is notified from the base station 1, a communication unit 25 transmits a signal to the base station 1 using the MIMO scheme.

In the base station 1, when the reception error rate for signals from the communication terminal 2 that transmits a signal using the MIMO scheme becomes larger than the first threshold, the communication unit 15 instructs this communication terminal 2 not to use the MIMO scheme in transmission. In the communication terminal 2, when it is notified that the MIMO scheme is not used in transmission from the base station 1, the communication unit 25 transmits a signal to the base station 1 using the adaptive array antenna scheme, not using the MIMO scheme. Then, in a case where the rank of the MCS to be applied to a transmission signal by the communication terminal 2 is the highest rank, the communication unit 15 instructs this communication terminal 2 to use the MIMO scheme in transmission when the reception error rate for signals from this communication terminal 2 becomes smaller than the second threshold. Hereinafter, the base station 1 and communication terminal 2 operate in a similar manner.

As described above, in the base station 1, an MCS to be applied to a transmission signal by the communication terminal 2 is combined with whether or not the MIMO scheme (MIMO-SDM) is used when the communication terminal 2 transmitting a signal, so that the transmission throughput of the communication terminal 2 is properly adjusted.

In a case where the use prohibition determination unit 143 prohibits the communication terminal 2 from using the MIMO scheme in signal transmission, the communication unit 15 does not notify the communication terminal 2 that the MIMO scheme is used in signal transmission even if the MCS to be applied to a transmission signal reaches the highest rank and the reception error rate for signals from the communication terminal 2 is smaller than the second threshold. In this case, thus, the transmission scheme is not switched from the non-MIMO scheme to the MIMO scheme in this communication terminal 2.

When starting communication with the communication terminal 2, the base station 1 may first instruct the communication terminal 2 to transmit a signal using the transmission diversity such as MIMO-STC or MIMO-SFBC. Then, when the rank of the MCS to be applied to a transmission signal by the communication terminal 2 reaches the highest rank, the base station 1 may instruct the communication terminal 2 to use the MIMO-SDM in signal transmission.

As in the case where the communication terminal 2 receives a signal from the base station 1, in the base station 1, when the communication terminal 2 uses the MIMO scheme in transmission, the reception processing unit 141 receives a data signal from the communication terminal 2 without using the adaptive array antenna scheme. When receiving a signal transmitted from the communication terminal 2 using the MIMO scheme, the reception processing unit 141 estimates a channel matrix of a transmission line between the base station 1 and the communication terminal 2 based on a reference signal from the communication terminal 2. Then, the reception processing unit 141 performs a reception process on data signals included in a plurality of received signals output from the radio processing unit 11 using the estimated channel matrix. Meanwhile, in a case where the communication terminal 2 does not use the MIMO scheme in transmission, the reception processing unit 141 receives a data signal from the communication terminal 2 using the adaptive array antenna scheme.

Figure 12:
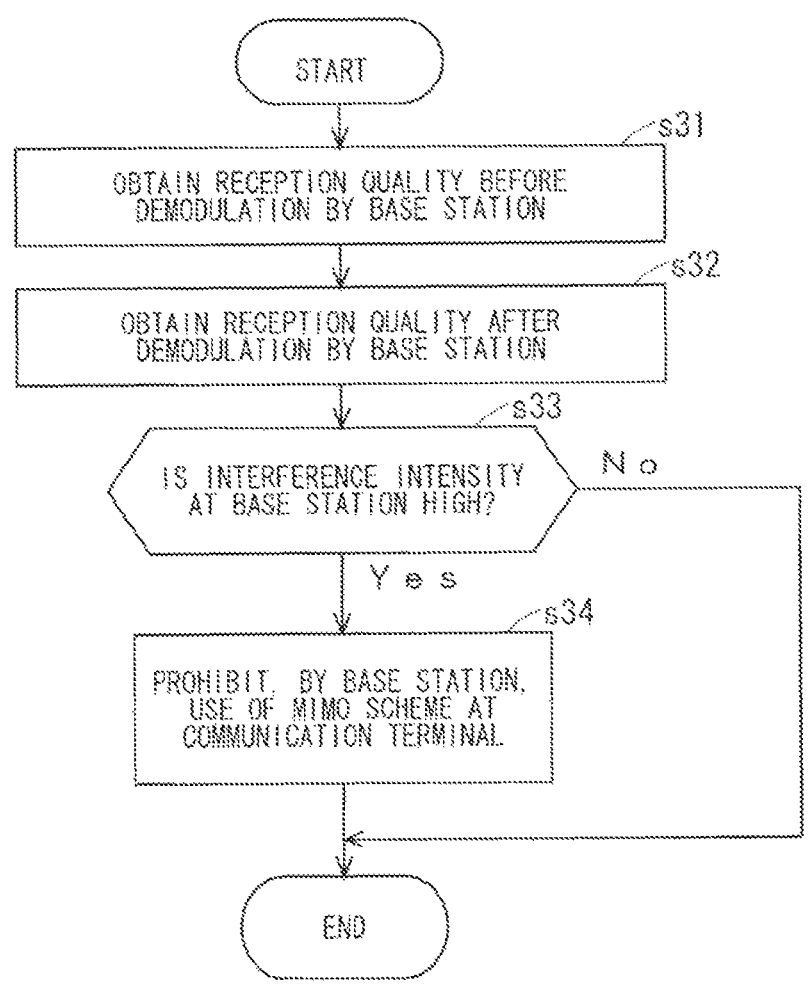
FIG. 12 is a flowchart showing an operation of the other modification of the base station.

FIG. 12 is a flowchart showing an operation of a wireless communication system 100 according to this modification, which corresponds to FIG. 4 described above. As shown in FIG. 12, in Step s31, in the base station 1, the reception quality acquisition unit 145 obtains a reception quality before demodulation for a signal from the communication terminal 2. In Step s32, next, the reception quality acquisition unit 145 obtains a reception quality after demodulation for the signal from the communication terminal 2.

In Step s33, next, the interference intensity judgment unit 142 judges whether or not the intensity of an interference wave included in a received signal from the communication terminal 2 is high based on the reception quality before demodulation and reception quality after demodulation obtained in Steps s31 and s32, as in the case where it is judged whether or not the interference intensity at the communication terminal 2 is high (in a similar manner to the method described with reference to FIG. 5).

When it is judged in Step s33 that the interference intensity included in the received signal from the communication terminal 2 is high, in Step s34, the use prohibition determination unit 143 prohibits the communication terminal 2 from using the MIMO scheme when transmitting a signal to the base station 1. Meanwhile, when it is judged in Step s33 that the interference intensity included in the received signal from the communication terminal 2 is low (is not high), the use prohibition determination unit 143 does not prohibit the communication terminal 2 from using the MIMO scheme when transmitting a signal to the base station 1.

As described above, in this modification, if the interference intensity of the received signal received from the communication terminal 2 by the base station 1 is high, the communication terminal 2 is prohibited from using the MIMO scheme in signal transmission. This prevents the base station 1 from performing a reception process on a data signal from the communication terminal 2 using a less accurate channel matrix. Therefore, the communication performance between the base station 1 and communication terminal 2 can be improved.

In the case where the base station 1 adjusts a transmission throughput at the communication terminal 2 as described above, if the intensity of an interference wave included in a received signal from the communication terminal 2 is high, an communication terminal 2 is not prohibited from using the MIMO scheme in signal transmission. In this case, in a situation where the interference intensity of the received signal from the communication terminal 2 is high, an MCS to be applied to a transmission signal by the communication terminal 2 reaches the highest rank, and a reception error rate for the received signal from the communication terminal 2 is smaller than the second threshold, the transmission scheme of the communication terminal 2 is switched from the non-MIMO scheme to the MIMO scheme. Upon this, the base station 1 performs a reception process on a data signal from the communication terminal 2 based on an inaccurate channel matrix. As a result, a reception error rate for signals from the communication terminal 2 becomes higher in the base station 1.

When the reception error rate for signals from the communication terminal 2 becomes higher in the base station 1, the base station 1 switches the transmission scheme of the communication terminal 2 from the MIMO scheme to the non-MIMO scheme. Upon this, the base station 1 receives a signal from the communication terminal 2 using the adaptive array antenna scheme. In a case where the base station 1 receives a signal from the communication terminal 2 using the adaptive array antenna scheme, the intensity of the interference wave included in the received signal can be reduced, resulting in a decrease in reception error rate for signals from the communication terminal 2.

As a result of a decrease in reception error rate for signals from the communication terminal 2, the base station 1 again switches the transmission scheme of the communication terminal 2 from the non-MIMO scheme to the MIMO scheme. Upon switching of the transmission scheme of the communication terminal 2 from the non-MIMO scheme to the MIMO scheme, similarly, a reception error rate for signals from the communication terminal 2 increases in the base station 1. As a result, the transmission scheme of the communication terminal 2 is switched from the MIMO scheme to the non-MIMO scheme. Hereinafter, the base station 1 and communication terminal 2 repeat similar operations.

If a communication terminal 2 is not prohibited from using the MIMO scheme in signal transmission in a case where the intensity of the interference wave included in a received signal from the communication terminal 2 is high as described above, in the communication terminal 2, switching from the non-MIMO scheme to the MIMO scheme and switching from the MIMO scheme to the non-MIMO scheme frequently occur in an alternate manner. This destabilizes the operation of the communication terminal 2. This results in a decrease in communication performance between the base station 1 and communication terminal 2.

In this embodiment, in a case where the intensity of an interference wave included in a received signal from the communication terminal 2 is high, the base station 1 prohibits the communication terminal 2 from using the MIMO scheme in signal transmission. Thus, in the communication terminal 2, switching from the non-MIMO scheme to the MIMO scheme and switching from the MIMO scheme to the non-MIMO scheme can be prevented from frequently occurring in an alternate manner. Thus, the operation of the communication terminal 2 can be prevented from becoming unstable. This results in a further improvement in communication performance between the base station 1 and communication terminal 2.

In this modification, in a case where the communication terminal 2 uses the MIMO scheme in transmission, the base station 1 does not receive a data signal from the communication terminal 2 using the adaptive array antenna scheme. This enables the base station 1 to properly receive a signal transmitted from the communication terminal 2 using the MIMO scheme. This will be described below.

When the communication terminal 2 transmits a signal using the MIMO scheme As in the case where the base station 1 transmits a signal using the MIMO scheme, a plurality of antennas 22 are configured not to transmit a plurality of different reference signals using the same radio resources (same frequency band and same transmission time slot) such that the base station 1 can properly estimate a channel matrix using the reference signals. Meanwhile, as to the data signal to be transmitted from the communication terminal 2 using the MIMO scheme, the plurality of antennas 22 transmit a plurality of different data signals using the same radio resources.

Here, in a case where the base station 1 properly receives, using the adaptive array antenna scheme, a data signal transmitted by the communication terminal 2 using the MIMO scheme, for each of a plurality of antennas 22 of the base station 1, the base station 1 needs to direct a beam toward a data signal transmitted from one antenna 12 and direct null toward a data signal transmitted from the other antenna 22.

However, in the communication terminal 2, the mode of transmitting a reference signal and the mode of transmitting a data signal differ from each other as described above when the MIMO scheme is used. For this reason, even if the base station 1 performs null steering for the reception directivity at the plurality of antennas 12 based on the reference signal transmitted from the communication terminal 2, for each of a plurality of antennas 22 included in the communication terminal 2, the base station 1 cannot direct a beam toward a data signal transmitted from one antenna 22 and direct null toward a data signal transmitted from the other antenna 22. Thus, the base station 1 cannot properly receive, using the adaptive array antenna scheme, a data signal transmitted from the communication terminal 2 using the MIMO scheme.

In this modification, therefore, the base station 1 is configured not to receive a data signal from a communication terminal 2 using the adaptive array antenna scheme in a case where the communication terminal 2 uses the MIMO scheme in transmission to the base station 1. This enables the base station 1 to properly receive a signal transmitted from the communication terminal 2 using the MIMO scheme. This results in a further improvement in communication performance between the base station 1 and communication terminal 2.

As in the first modification, also in this modification, the base station 1 may prohibit a communication terminal 2 from using the MIMO scheme in transmission in a case where the interference intensity of the received signal from the communication terminal 2 is high and also in a case where the reception quality for a signal from the communication terminal 2 is not good (is poor). Then, even in a case where the interference intensity of the received signal from the communication terminal 2 is high, the base station 1 does not need to prohibit the communication terminal 2 from using the MIMO scheme in transmission when the reception quality for a signal from the communication terminal 2 is good.

As described above, even in a case where the interference intensity of the received signal from a communication terminal 2 is high, the communication terminal 2 is not prohibited from using the MIMO scheme in transmission when the reception quality for a signal from the communication terminal 2 is good. This prevents a situation in which a communication terminal 2 is prevented from using the MIMO scheme in signal transmission even though the reception quality for a signal from the communication terminal 2 is good. Thus, the communication terminal 2 can more properly use the MIMO scheme, resulting in a further improvement in communication quality between the base station 1 and communication terminal 2.

As in the second modification, also in this modification, in a case where the communication terminal 2 uses the MIMO scheme in transmission, the base station 1 may use the adaptive array antenna scheme when receiving a reference signal for obtaining a channel matrix from the communication terminal 2. In this case, first, the reception processing unit 141 of the base station 1 calculates a plurality of reception weights for controlling the reception directivity at the array antenna 13 based on a reference signal from the communication terminal 2. Then, the reception processing unit 141 respectively sets the calculated plurality of reception weights to the plurality of reference signals received by a plurality of antennas 12. After that, the reception processing unit 141 combines the plurality of reference signals in which the plurality of reception weights have been set, to thereby generate an array received reference signal. As a result, the communication unit 15 performs null steering and beamforming for the reception directivity at the plurality of antennas 12, to thereby receive a reference signal from the communication terminal 2.

After that, the reception processing unit 141 estimates a channel matrix of a desired wave in a transmission line between the base station 1 and communication terminal 2 based on the generated array received reference signal, that is, based on the reference signal received using the adaptive array antenna scheme. Equation (4) above can be used in estimating a channel matrix of a desired wave.

After estimating a channel matrix of a desired wave, the reception processing unit 141 performs a reception process such as a demodulation process on a data signal from the communication terminal 2 using the channel matrix. This enables the base station 1 to obtain user data and control data transmitted from the communication terminal 2.

As described above, the base station 1 performs null steering for the reception directivity at a plurality of antennas 12 and receives reference signals from the communication terminal 2, to thereby estimate a channel matrix of a desired wave based on a reference signal having the interference wave whose intensity is high included in the received signals. Thus, a highly accurate channel matrix can be obtained, and a reception process can be performed on data signals from the communication terminal 2 using this channel matrix. As a result, the data included in the data signals from the communication terminal 2 can be properly obtained.

While the invention has been described in detail, the foregoing description is in all aspects illustrative and not restrictive. It will be appreciated that numerous modifications unillustrated herein can be made without departing from the scope of the present invention.

REFERENCE SIGNS LIST 1 base station
2 communication terminal
12, 22 antenna 15, 25 communication unit
100 wireless communication system
142 interference intensity judgment unit
143 use prohibition determination unit
144 reception quality judgment unit
145, 242 reception quality acquisition unit

The invention claimed is:

1. A wireless communication device that communicates with, using a first plurality of antennas, a communication partner device including a second plurality of antennas, the device comprising circuitry configured to:
communicate with the communication partner device using the first plurality of antennas and use a MIMO (multiple input multiple output) scheme in transmitting a signal to the communication partner device;
judge, based on predetermined criteria, whether or not an intensity of an interference wave included in a received signal at the communication partner device is high, wherein the predetermined criteria includes a reception quality obtained based on a received signal yet to be subjected to a demodulation process in the communication partner device and a reception quality obtained based on a received signal subjected to the demodulation process in the communication partner device; and
determine to prohibit, upon judging that the intensity of the interference wave is high, using the MIMO scheme when transmitting a signal.

2. The wireless communication device according to claim 1, wherein the circuitry is further configured to:
judge whether or not a reception quality at the communication partner device is good based on predetermined criteria;
allow the use of the MIMO scheme when transmitting a signal in a case where the intensity of the interference wave is judged to be high and where the reception quality is judged to be good, and
prohibit the use of the MIMO scheme when transmitting a signal in a case where the intensity of the interference wave is judged to be high and where the the reception quality is judged to be not good.

3. A wireless communication device that communicates with, using a first plurality of antennas, a communication partner device including a second plurality of antennas, the communication partner device being configured to use a MIMO (multiple input multiple output) scheme when transmitting a signal to the wireless communication device,
the wireless communication device comprising circuitry configured to:
communicate with the communication partner device using the first plurality of antennas and is configured to, when receiving a signal from the communication partner device, perform null steering using an algorithm that does not need information regarding an interference wave for a reception directivity at the first plurality of antennas, wherein
in a case where the communication partner device transmits a signal without using the MIMO scheme, perform the null steering based on a known reference signal from the communication partner device and receive a data signal from the communication partner device, and
in a case where the communication partner device transmits a signal using the MIMO scheme, not perform the null steering based on a known reference signal from the communication partner device and receive a data signal from the communication partner device.

4. The wireless communication device according to claim 3, wherein in a case where the communication partner device transmits a signal using the MIMO scheme, the circuitry is configured to estimate a channel matrix of a desired wave based on a known reference signal, which has been received through the null steering based on the known reference signal from the communication partner device, from the communication partner device and perform a reception process on the data signal from the communication partner device using the estimated channel matrix.

5. A wireless communication device that communicates with, using a first plurality of antennas, a communication partner device including a second plurality of antennas, the communication partner device being configured to use a MIMO (multiple input multiple output) scheme when transmitting a signal to the wireless communication device, the wireless communication device comprising circuitry configured to:
communicate with the communication partner device using the first plurality of antennas;
judge, based on predetermined criteria, whether or not an intensity of an interference wave included in a received signal is high; and
determine to prohibit, upon judging that the intensity of the interference wave is high, using the MIMO scheme when the communication partner device transmits a signal,
wherein the circuitry is configured to, when receiving a signal from the communication partner device, perform null steering using an algorithm that does not need information regarding an interference wave for a reception directivity at the first plurality of antennas, wherein:
in a case where the communication partner device transmits a signal without using the MIMO scheme, the circuitry is configured to perform the null steering based on a known reference signal from the communication partner device and receive a data signal from the communication partner device; and
in a case where the communication partner device transmits a signal using the MIMO scheme, the circuitry is configured to not perform the null steering based on a known reference signal from the communication partner device and receive a data signal from the communication partner device.

6. The wireless communication device according to claim 5, wherein the circuitry is further configured to:
perform a demodulation process on a received signal; and
obtain a reception quality based on a received signal yet to be subjected to the demodulation process and obtains a reception quality based on a received signal subjected to the demodulation process,
wherein whether or not the intensity of the interference wave is high is judged based on the reception quality based on the received signal yet to be subjected to the demodulation process and the reception quality based on the received signal subjected to the demodulation process.

7. The wireless communication device according to claim 5, wherein the circuitry is further configured to:
judge, based on predetermined criteria, whether or not a reception quality is good, wherein
in a case where the intensity of the interference wave is high but in a case where the reception quality is judged to be good, allow the use of the MIMO scheme when the communication partner device transmits a signal, and
in a case where the intensity of the interference wave is high and in a case where the reception quality is judged to be not good, prohibit the use of the MIMO scheme when the communication partner device transmits a signal.

8. The wireless communication device according to claim 5, wherein in a case where the communication partner device transmits a signal using the MIMO scheme, the circuitry is configured to estimate a channel matrix of a desired wave based on a known reference signal, which has been received through the null steering based on the known reference signal from the communication partner device, from the communication partner device and perform a reception process on the data signal from the communication partner device using the estimated channel matrix.

* * * * *